(12) United States Patent
Ballantine et al.

(10) Patent No.: US 11,502,340 B2
(45) Date of Patent: Nov. 15, 2022

(54) BATTERY ANALYSIS VIA ELECTROCHEMICAL IMPEDANCE SPECTROSCOPY APPARATUS (EISA) MEASUREMENTS

(71) Applicant: BLOOM ENERGY CORPORATION, San Jose, CA (US)

(72) Inventors: Arne Ballantine, Palo Alto, CA (US); John Cronin, Jericho, VT (US); Joseph Bodkin, Williston, VT (US)

(73) Assignee: BLOOM ENERGY CORPORATION, San Jose, CA (US)

( * ) Notice: Subject to any disclaimer, the term of this patent is extended or adjusted under 35 U.S.C. 154(b) by 905 days.

(21) Appl. No.: 16/363,435

(22) Filed: Mar. 25, 2019

(65) Prior Publication Data

US 2019/0296403 A1    Sep. 26, 2019

Related U.S. Application Data

(60) Provisional application No. 62/647,365, filed on Mar. 23, 2018.

(51) Int. Cl.
| | |
|---|---|
| *H01M 10/48* | (2006.01) |
| *H01M 10/42* | (2006.01) |
| *G06N 5/04* | (2006.01) |
| *G05B 13/02* | (2006.01) |
| *H02J 7/00* | (2006.01) |
| *H01M 10/44* | (2006.01) |

(52) U.S. Cl.
CPC ...... *H01M 10/4285* (2013.01); *G05B 13/021* (2013.01); *G06N 5/04* (2013.01); *H01M 10/44* (2013.01); *H01M 10/48* (2013.01); *H02J 7/007* (2013.01); *H02J 7/0047* (2013.01)

(58) Field of Classification Search
None
See application file for complete search history.

(56) References Cited

U.S. PATENT DOCUMENTS

| | | | |
|---|---|---|---|
| 9,461,319 B2 | 10/2016 | Sudhan et al. | |
| 9,461,320 B2 | 10/2016 | Ballantine et al. | |
| 2003/0052689 A1* | 3/2003 | Jang | H01M 10/482 324/430 |

(Continued)

OTHER PUBLICATIONS

U.S. Appl. No. 16/363,160, filed Mar. 25, 2019, Bloom Energy Corporation.

(Continued)

*Primary Examiner* — Raymond Alejandro
(74) *Attorney, Agent, or Firm* — The Marbury Law Group PLLC

(57) ABSTRACT

Electrochemical impedance spectroscopy (EIS) may be used to measure the internal components of a battery or interfaces between connections inside a battery in order to determine a state of one or more subcomponents of the battery. In various embodiments, EIS testing of the battery may be conducted using various test waveforms, such as test waveforms with different voltages, currents, and/or frequencies, to identify and/or predict battery subcomponent and/or interface failures. In various embodiments, EIS testing of the battery may be used to determine when battery conditions are suitable for charging.

15 Claims, 15 Drawing Sheets

(56) References Cited

U.S. PATENT DOCUMENTS

2015/0072198 A1* 3/2015 Fink ............... H01M 10/44
                                                429/90
2017/0077535 A1  3/2017 Sudhan et al.
2018/0166911 A1* 6/2018 Ionescu ............ G01R 31/382

OTHER PUBLICATIONS

U.S. Appl. No. 16/363,214, filed Mar. 25, 2019, Bloom Energy Corporation.
U.S. Appl. No. 16/363,262, filed Mar. 25, 2019, Bloom Energy Corporation.
U.S. Appl. No. 16/363,361, filed Mar. 25, 2019, Bloom Energy Corporation.

* cited by examiner

| Interface | Waveform | Command | Test waveform |
|---|---|---|---|
| Interface 1 | Waveform 1.1 | Apply input for 2 sec and take output for 3 sec | Sinusoid, 100 Hz, 2 mA |
| Interface 1 | Waveform 1.2 | Apply input for 2 sec and take output for 3 sec | Sinusoid, 100 Hz, 2 mA |
| Interface N | Waveform N.N | Apply input for 12 sec and take output for 20 sec | Sinusoid, 200 Hz, 2 mA |

FIG. 10

| Input | Result 1 | Result 2 | Result N |
|---|---|---|---|
| Waveform 1.1 | Normal W1.1R1.DAT | Over Heating W1.1R2.DAT | Danger W1.1RN.DAT |
| Waveform 1.2 | Normal W1.2R1.DAT | Overheating W1.2R2.DAT | Danger W1RN.DAT |
| Waveform N.N | Normal WN.NR1.DAT | Electrolyte Breakdown started WN.NR2.DAT | Danger WN.NRN.DAT |

| Data Database | | | |
|---|---|---|---|
| Battery Type | Battery ID | Test Waveform | Response Waveform |
| Li-ion, MNC | LiXXXX | Sinusoid, 100 Hz, 2mA | Response file 1. dat |
| Li-ion, MNC | LiXXXX | Sinusoid, 100 Hz, 2mA | Response file 2. dat |
| Pb Acid | PbAAA | Sinusoid, 200 Hz, 2mA | Response file 3. dat |
| Li-ion, LiFePO | LiUUUU | Sinusoid, 120 Hz, 2mA | Response file 4. dat |
| Ni-Cd | Ni1233 | Sinusoid, 10 Hz, 2mA | Response file 5. dat |

| Command Database | | |
|---|---|---|
| Battery Type | Battery ID | Commands |
| Li-ion, MNC | LiXXXX | Apply input for 2 sec and take output for 3 sec |
| Li-ion, MNC | LiXXXX | Apply input for 2 sec and take output for 3 sec |
| Pb Acid | PbAAA | Apply input for 12 sec and take output for 20 sec |
| Li-ion, LiFePO | LiUUUU | Apply input for 5 sec and take output for 10 sec |
| Ni-Cd | Ni1233 | Apply input for 2 sec and take output for 2 sec |

BATTERY ANALYSIS VIA ELECTROCHEMICAL IMPEDANCE SPECTROSCOPY APPARATUS (EISA) MEASUREMENTS

CROSS REFERENCE TO RELATED APPLICATIONS

This application claims the benefit of priority to U.S. Provisional Patent Application Ser. No. 62/647,365 filed Mar. 23, 2018, entitled "Battery Analysis Via Electrochemical Impedance Spectroscopy Apparatus (EISA) Measurements", the contents of which are incorporated herein by reference in their entirety.

BACKGROUND

Batteries may be susceptible to degradation from charging and discharging cycles because of the effects these factors may have on the internal chemistry of batteries. Battery degradation from charge and discharge cycles may be caused by adhesion of oxidized particles to an anode and a cathode reducing a surface area for reacting with an electrolyte, reducing an amount of the electrolyte in the battery, and increase an internal resistance of the battery. Battery degradation may result in a reduced power storage capacity, a reduced voltage output, and an increased self-discharge rate. These degradations of a battery's performance may also reduce a useful life of a battery.

SUMMARY

The systems, methods, and devices of the various embodiments enable electrochemical impedance spectroscopy ("EIS") to be performed on batteries. In various embodiments, EIS may be used to determine conditions of the internal components of a battery or interfaces between connections inside a battery in order to determine battery conditions or a state of one or more subcomponents of the battery. In various embodiments, EIS testing of the battery may be conducted using various test waveforms, such as test waveforms with different voltages, currents, shapes and/or frequencies, to identify and/or predict battery subcomponent and/or interface failures. In various embodiments, EIS testing of the battery may be used to enable charging of the battery when battery conditions are suitable for charging.

Various embodiments may provide system and methods for EIS testing of a battery. Various embodiments may include applying an EIS test waveform to an EIS system to the battery, receiving a response waveform result from the battery, comparing the response waveform to waveforms in a recommendations database to determine a matching waveform, determining whether the matching result indicates a normal battery condition, and displaying a recommendation correlated to the matching waveform from the recommendations database on a graphical user interface ("GUI") of a battery-powered device connected to the battery in response to determining that the matching waveform does not indicate a normal battery condition. Various embodiments may further include determining whether the matching waveform indicates battery conditions are suitable for charging, controlling a charger to charge the battery in response to determining the matching waveform indicates battery conditions are suitable for charging, and controlling the charger to stop charging the battery in response to determining the matching waveform indicates battery conditions are unsuitable for charging.

DESCRIPTION OF THE DRAWINGS

The accompanying drawings, which are incorporated herein and constitute part of this specification, illustrate example embodiments of various embodiments, and together with the general description given above and the detailed description given below, serve to explain the features of the claims.

FIG. 10 illustrates a memory structure of an example battery study database according to various embodiments.

FIG. 11 illustrates a memory structure of an example recommendations database according to various embodiments.

FIG. 13A is a table illustrating an example EIS system test database according to various embodiments.

FIG. 13B is a table illustrating an example EIS system command database according to various embodiments.

DETAILED DESCRIPTION

Figure 1:
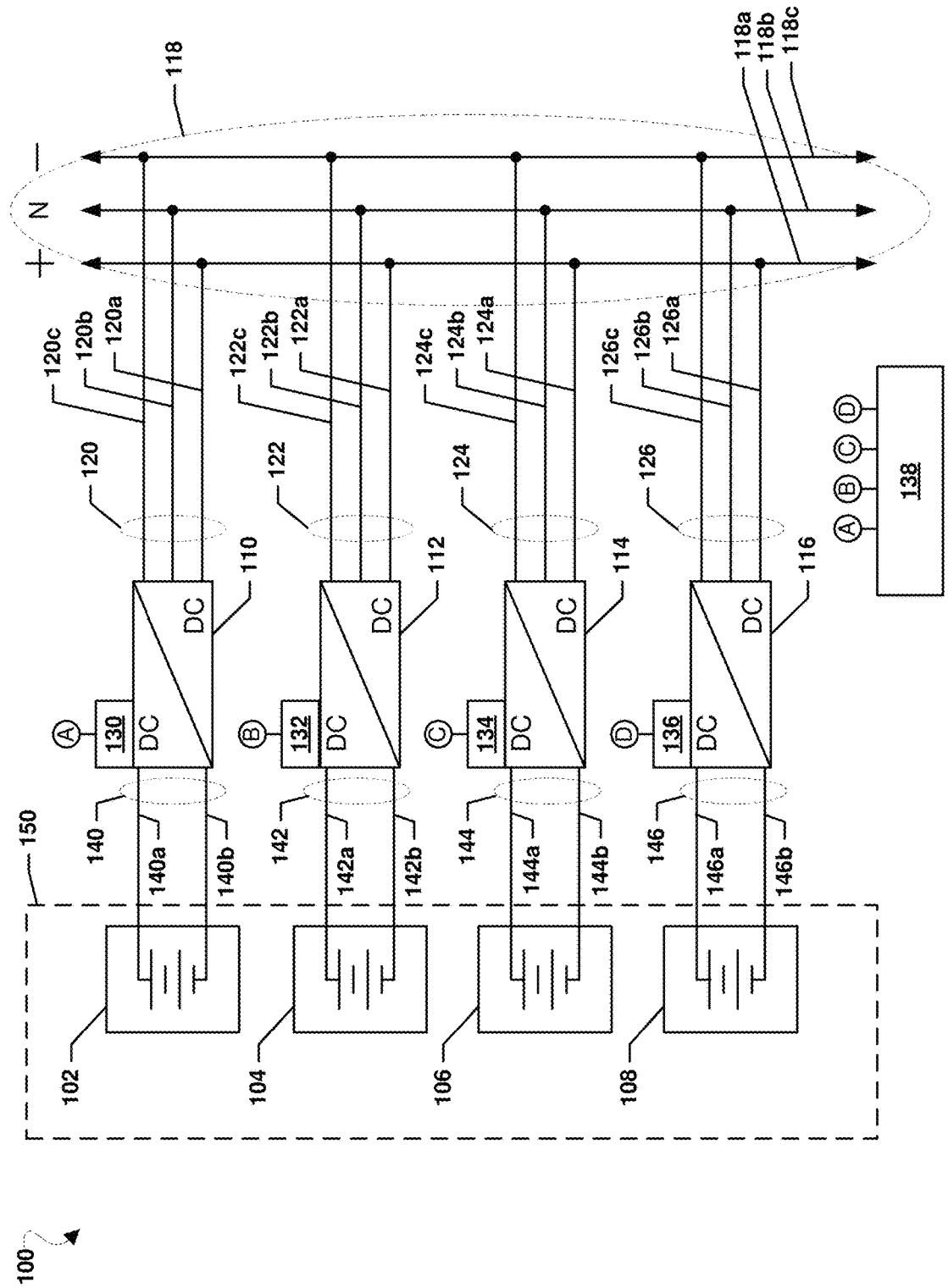
FIG. 1 is a block diagram of a system according to an embodiment.

Various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the claims.

Many types of batteries are susceptible to degradation from charging and discharging cycles, heat and cold exposure, and aging because of the effects these factors may have on the internal chemistry of batteries. For example, any one or combination of the battery degradation factors may result in deposits of oxidized particles of an electrolyte adhering to an anode and a cathode of a battery. The adhesion of the oxidized particles to the anode and the cathode may reduce a surface area of the anode and the cathode for reacting with the electrolyte, reduce an amount of electrolyte in the battery, and increase the internal resistance of the battery. Battery degradation may result in a reduced power storage capacity, a reduced voltage output, and an increased self-discharge rate. These degradations of a battery's performance may also reduce a useful life of a battery. In some embodiments, battery charging may be managed to improve efficiency, performance, and/or longevity of batteries.

The term "battery" may be used interchangeably herein to refer to a battery pack, which may include any number batteries, a battery, which may include any number of battery cells, and/or a battery cell of a battery. A battery may include any rechargeable wet cell battery, rechargeable dry cell battery, and/or rechargeable solid state battery.

The systems, methods, and devices of the various embodiments enable electrochemical impedance spectroscopy (EIS) (also called AC impedance spectroscopy) to be performed on batteries by power electronics connecting the batteries in parallel to a common load and/or bus.

EIS enables the overall impedance of a battery to be determined by applying a test waveform of varying voltage, varying current, or varying voltage and current to the battery and measuring a voltage or current across the battery at varying sampling frequencies to determine a response waveform of varying voltage, varying current, or varying voltage and current. A test waveform of varying voltage, varying current, or varying voltage and current may be selected to achieve the varying sampling frequencies, such as a waveform with voltage/current oscillations of approximately 1 Hz, may be generated on a line connected to the battery. Such a voltage/current waveform may be generated by rapid switching of the line to load and unload the battery, thereby injecting the test waveform into the battery. The test waveform may be a sine wave or other type pattern of variation with time of voltage, current or voltage and current, and may be selected to achieve desired sampling frequencies for a particular EIS test. A voltage or current of the battery and a resulting phase angle may be measured or determined at a sampling frequency to obtain a response waveform, and the response waveform or the resulting measurements/determinations processed using EIS to determine battery impedances. During EIS testing, a number of different voltage/current waveforms may be applied to the battery to obtain different response waveforms, such as impedance measured at various applied waveform frequencies. For ease of reference, a waveform of varying voltage, varying current, or varying voltage and current applied to the battery is referred to herein and in the claims as a "test waveform" to encompass applied voltage, current and voltage/current waveforms. For ease of reference, measurements of voltage, current or voltage and current across the battery while a test waveform is applied are referred generally and collectively in the specification and the claims as a "response waveform." By comparing the applied test waveform to the measured or determined response waveform, an impedance response of the battery may be determined at the frequency of the applied test waveform.

Results of the EIS procedure (e.g., the impedance at varying frequencies) may be graphically represented using a Nyquist plot or Bode plot and characteristics of the battery may be determined based on the impedance response of the battery. By comparing the impedance response of the battery being measured to known signatures of impedance responses of batteries with known characteristics, the characteristics of the measured battery may be identified. Characteristics of the battery that may be determined based at least in part on the impedance response include charge conditions (e.g., state of charge), anode conditions, and cathode conditions. Based on the determined characteristics of the battery, a charging operation may be conducted and/or a charging rate of the battery may be adjusted. Additionally, determined characteristics of the battery may be compared to a failure threshold, and when the characteristics exceed the failure threshold, a failure mode of the battery may be indicated, such as a buildup of non-conductive compounds on the anode or cathode, dendritic breakdown of the electrolyte, etc.

In an embodiment, the power electronics connected to each battery of a group of two or more batteries may compensate for any ripple generated during EIS such that no ripple or a reduced ripple is realized at the common load and/or bus. As one power electronics injects the test waveform into its respective battery, a resulting ripple from that power electronics may be applied to the load and/or bus. To counteract this ripple from the power electronics performing EIS monitoring, an offsetting (or canceling) ripple or ripples may be generated by one or more of the other power electronics. To generate the offsetting (or canceling) ripple or ripples one or more of the other power electronics not presently performing EIS monitoring may inject an offset waveform toward their respective battery resulting in an offsetting ripple being applied to the common load and/or bus connected in parallel to the batteries. The sum of the ripple from the power electronics performing EIS monitoring and the offsetting ripple or ripples from the one or more other power electronics may be a DC output resulting in little or no ripple at the load and/or common bus.

In another embodiment, other devices connected to the common load and/or bus may compensate for any ripple generated during EIS such that no ripple or a reduced ripple is realized at the common load and/or bus. As discussed above, as one power electronics injects the test waveform into its respective battery, a resulting ripple from that power electronics may be applied to the load and/or bus. To counteract this ripple from the power electronics performing EIS monitoring, an offsetting (or canceling) ripple or ripples may be generated by one or more other device, such as a waveform generator, and injected into the common load and/or bus. To generate the offsetting (or canceling) ripple or ripples one or more other device may apply an offset ripple to the common load and/or bus connected in parallel to the batteries. The sum of the ripple from the power electronics performing EIS monitoring and the offsetting ripple or ripples applied by the other device may be a DC output resulting in no ripple at the load and/or common bus.

In an embodiment, during EIS monitoring the impedance of a segment may be determined as the polar form voltage of the segment over the polar form current of the segment. This may enable a Fourier series calculation to be used to allow for analysis of an imperfect sinusoidal ripple at the fundamental frequency without needing to calculate a full Fast Fourier Transform. This may increase the accuracy of the impedance calculation and decrease the processing time required to determine an impedance response in comparison to impedance determinations made using a full Fast Fourier Transform.

In an embodiment, energy storage devices may be included on the power electronics connected to each battery. Energy storage devices may be any type energy storage devices, such as capacitors, supercapacitors, batteries, etc. In various embodiments, the energy storage devices may be on the output, the input, or windings of the transformer of the power electronics to store ripple energy and discharge the ripple energy out of phase. The energy storage device may reduce the ripple current, or eliminate the ripple current, passing to the bus. The ability to reduce and/or eliminate the ripple current resulting from EIS testing may enable EIS testing using test waveforms with higher frequencies than may be used without the energy storage devices. For example, test waveforms with frequencies at or above 400

Hz may be used, greatly extending the bandwidth of the power electronics to create and analyze test waveforms. Without the energy storage devices the bandwidth of the test waveform frequencies may be practically limited to frequencies less than the switching frequency of the power electronics. With the energy storage devices, the bandwidth of the test waveform frequencies may extend to frequencies greater than the switching frequency of the power electronics.

In a specific embodiment, the batteries may be one or more battery stack segments, such as one, two, three, four, or more battery stack segments, and the power electronics devices may be DC to DC converters. The battery stack segments may be any type of rechargeable batteries.

FIG. 1 is a block diagram of a system 100 according to an embodiment. The system 100 may include any number of batteries 102, 104, 106, and 108. For example, the batteries 102, 104, 106, and 108 may each be battery stack segments of battery packs or battery assemblies that may constitute a portion of a power module 150. Each battery 102, 104, 106, and 108 may be electrically connected via a respective input connection 140, 142, 144, and 146 to a respective one of power electronics 110, 112, 114, and 116. Each input connection 140, 142, 144, and 146 may comprise a respective positive input connection 140a, 142a, 144a, and 146a as well as a respective negative input connection 140b, 142b, 144b, and 146b. In operation, the batteries 102, 104, 106, and 108 may output DC voltages to their respective power electronics 110, 112, 114, and 116 via their respective input connections 140, 142, 144, and 146.

The power electronics 110, 112, 114, and 116 may be DC to DC converters, for example 380 volt 23 amp DC to DC converters. The power electronics 110, 112, 114, and 116 may be each include controllers 130, 132, 134, and 136, respectively, each connected, wired or wirelessly, to a central controller 138. The controllers 130, 132, 134, and 136 may be processors configured with processor-executable instructions to perform operations to control their respective power electronics 110, 112, 114, and 116, and the controller 138 may be a processor configured with processor-executable instructions to perform operations to exchange data with and control the operations of power electronics 110, 112, 114, and 616 via their respective controllers 130, 132, 134, and 136. Via the connections A, B, C, and D between the controllers 130, 132, 134, 136 connected to the power electronics 110, 112, 114, and 116 and the controller 138, the controller 138 may be effectively connected to the power electronics 110, 112, 114, and 116 and control the operations of the power electronics 110, 112, 114, and 116.

The power electronics 110, 112, 114, and 116 may be connected in parallel to a DC bus 118 by their respective output connections 120, 122, 124, and 126. In an embodiment, the DC bus 118 may be a three phase bus comprised of a positive line 118a, a neutral line 118b, and a negative line 118c, and the respective output connections 120, 122, 124, and 126 may include respective positive output connections 120a, 122a, 124a, and 126a, respective neutral output connections 120b, 122b, 124b, and 126b, and respective negative output connections 120c, 122c, 124c, and 126c. In operation, the power electronics 110, 112, 114, and 116 may output DC voltages to the bus 118 via their respective output connections 120, 122, 124, and 126. In an embodiment, power electronics 110, 112, 114, and 116 may be three phase converters configured to receive positive and negative DC inputs from their respective batteries 102, 104, 106, and 108 and output positive DC, negative DC, and neutral outputs to the bus 118 via their respective positive output connections 120a, 122a, 124a, and 126a, respective neutral output connections 120b, 122b, 124b, and 126b, and respective negative output connections 120c, 122c, 124c, and 126c. In an alternative embodiment, power electronics 110, 112, 114, and 116 may each be comprised of dual two phase converters. The positive output of the first of the two phase converters may be connected to the positive line 118a of the bus 118 and the negative output of the second of the two phase converters may be connected to the negative line 118c of the bus 118. The negative output of the first of the two phase converters and the positive output of the second of the two phase converters may be connected together to the neutral line 118b of the bus 118.

In an embodiment, the power electronics 110, 112, 114, and 116 may each be configured to perform EIS monitoring of their respective battery 102, 104, 106, and 108. The controller 138 may select a test waveform for use in EIS monitoring for one of the batteries 102, 104, 106, or 108, and may control that power electronics 110, 112, 114, or 116 of that battery 102, 104, 106, or 108 to inject the selected test waveform onto the respective input connection 140, 142, 144, or 146. For example, the controller 138 may send an indication of the selected test waveform to the controller 130 of power electronics 110 to cause opening and closing of a switch at the power electronics 110 to generate the selected test waveform via pulse width modulation on the input connection 140 of connected to the battery 102. The power electronics 110, 112, 114, or 116 injecting the test waveform may be configured to monitor the resulting impedance response of its respective battery 102, 104, 106, or 108, and via its respective controller 130, 132, 134, or 136 may output an indication of the monitored impedance response to the controller 138. Continuing with the preceding example, power electronics 110 may monitor the impedance response on the input connection 140 to the battery 102 and the controller 130 may indicate the impedance response of battery 102 to the controller 138.

The controller 138 may use the impedance response determined by EIS monitoring of a battery 102, 104, 106, 108 to determine a characteristic of that battery 102, 104, 106, 108 and may adjust a setting of the system 100 based on the determined characteristic. For example, the controller 138 may determine the impedance response according to method 500 described further below with reference to FIG. 5. The controller 138 may compare the impedance response determined by EIS monitoring of a battery 102, 104, 106, 108, such as a plot of the impedance response and/or stored impedance values, to impedance responses stored in a memory, such as stored plots of impedance responses and/or stored impedance values, of similar batteries correlated with known characteristics. The controller 138 may compare the impedance response determined by EIS monitoring of a battery 102, 104, 106, 108 to the stored impedance responses in any manner to identify matches between the impedance responses determined by EIS monitoring of a battery 102, 104, 106, 108 and the stored impedance responses.

When the controller 138 determines a match (e.g., identically or within some predetermined variance value) between the impedance response determined by EIS monitoring of a battery 102, 104, 106, 108 and a stored impedance response, the controller 138 may determine the characteristic correlated with the stored impedance response to be the characteristic of the respective battery 102, 104, 106, 108. For example, EIS monitoring may enable determined characteristics of the batteries 102, 104, 106, or 108 to be compared to charge state characteristics to determine an amount of charge stored in the batteries or whether charging of the batteries is indicated, and a suitable charging operation may be scheduled or commenced. As another example, EIS monitoring may enable determined characteristics of the batteries 102, 104, 106, or 108 to be compared to a failure threshold, and when the characteristics exceed the failure threshold a failure mode of the battery 102, 104, 106, or 108 may be indicated or determined, such as cathode or anode degradation, dendritic degradation of the electrolyte, chemical breakdown of the electrolyte, etc. Based on an indicated or determined failure mode, a suitable response may be indicated or taken, such as adjusting charging and discharging usage of one or more batteries 102, 104, 106, or 108 to extend the useful life of the power assembly 150, adjusting a charging rate and/or a discharging rate to slow or limit further battery degradation, performing a maintenance cycle on one or more of the batteries 102, 104, 106, or 108 (e.g., a deep discharge followed by full recharge), isolating one of the batteries 102, 104, 106, or 108 to prevent failure, and/or indicating that one or more batteries 102, 104, 106, or 108 are reaching end of life and should be replaced.

When a test waveform is injected on an input connection 140, 142, 144, or 146 by a respective power electronics 110, 112, 114, or 116 to perform EIS monitoring, a ripple on the respective output connection 120, 122, 124, or 126 may occur. If unaccounted for, the resulting ripple from the power electronics 110, 112, 114, or 116 performing EIS monitoring may cause an undesired ripple on the DC bus 118. To prevent a ripple on the DC bus 118, the ripple from the power electronics 110, 112, 114, or 116 performing EIS monitoring may be offset or canceled by other ripples injected into the DC bus 118. In an embodiment, the other ripples may be generated by one or more of the other power electronics 110, 112, 114, or 116 not performing EIS monitoring. The ripples from one or more of the other power electronics 110, 112, 114, or 116 not performing EIS monitoring may be generated by controlling the one or more of the other power electronics 110, 112, 114, or 116 not performing EIS monitoring to inject an offset waveform into their respective input connections to their respective input connections 140, 142, 144, or 146. The offset waveform or waveforms may be selected by the controller 138 such that the ripples on the respective output connections 120, 122, 124, or 126 generated in response to injecting the offset waveform or waveforms cancels the ripple caused by the power electronics 110, 112, 114, or 116 performing EIS monitoring when the waveforms are summed at the DC bus 118. In another embodiment, ripples may be injected into output connections 120, 122, 124, or 126 from devices other than the power electronics 110, 112, 114, or 116 to cancel the ripple caused by the power electronics 110, 112, 114, or 116 performing EIS monitoring when the waveforms are summed at the DC bus 118. For example, a waveform generator may be connected to output connections 120, 122, 124, or 126 to inject canceling ripples in response to EIS monitoring.

Figure 2A:
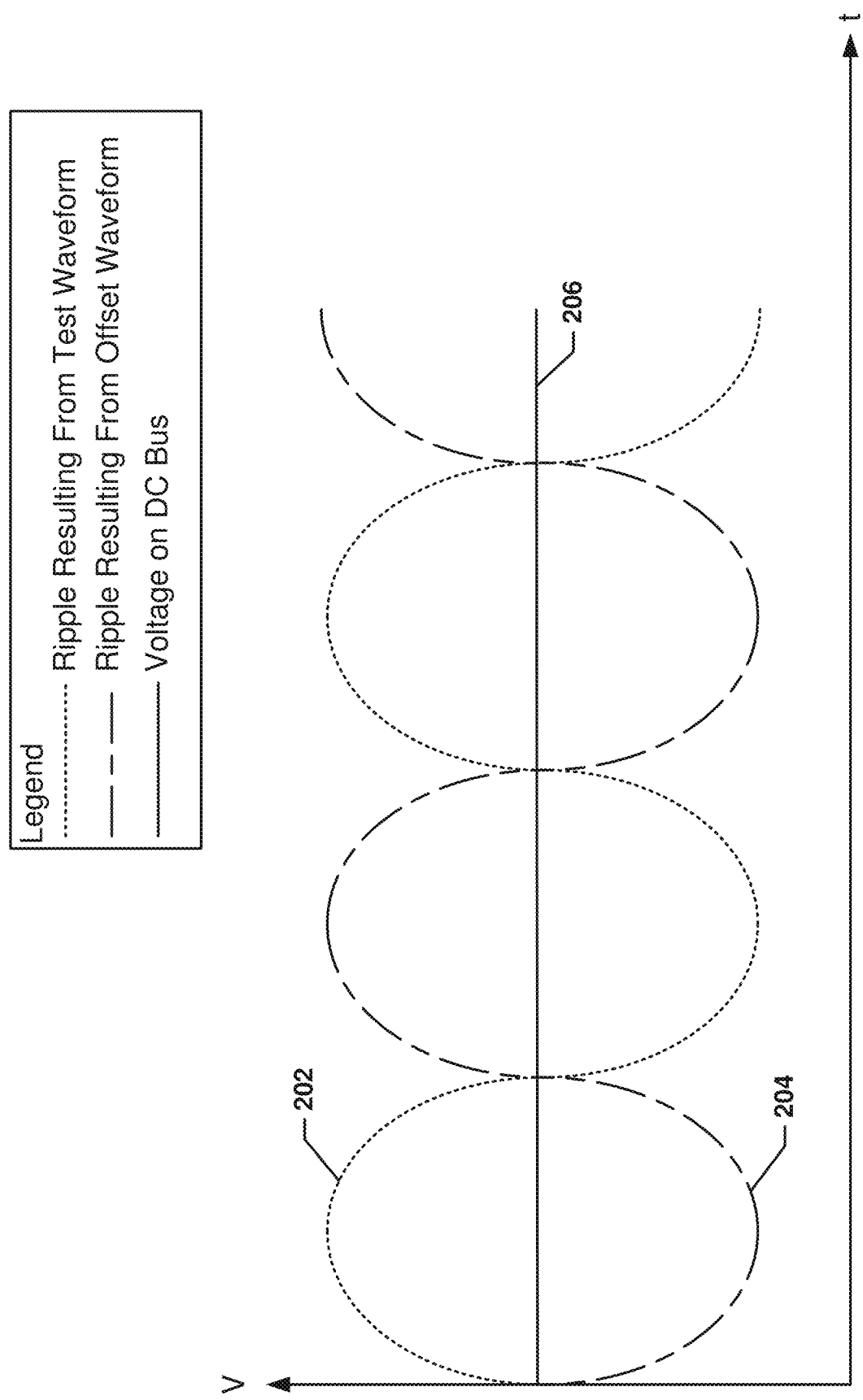
FIGS. 2A and 2B are graphs illustrating canceling ripples on a DC bus over time.

FIG. 2A is a graph illustrating canceling ripples on a DC bus over time. A test waveform injected onto an input connection of a battery by a power electronics may result in a ripple 202 sent from the power electronics injecting the test waveform toward a DC bus. An offset waveform injected onto an input connection of another battery by another power electronics may result in a ripple 204 sent from that power electronics injecting the offset waveform toward the DC bus. The offset waveform may be selected such that the ripple 204 is 180 degrees out of phase with the ripple 202. The power electronics may be connected to the DC bus in parallel and the sum of the ripple 202 and the ripple 204 may cancel each other out such that the sum of the waveforms is the desired DC voltage 206 on the DC bus.

Figure 2B:
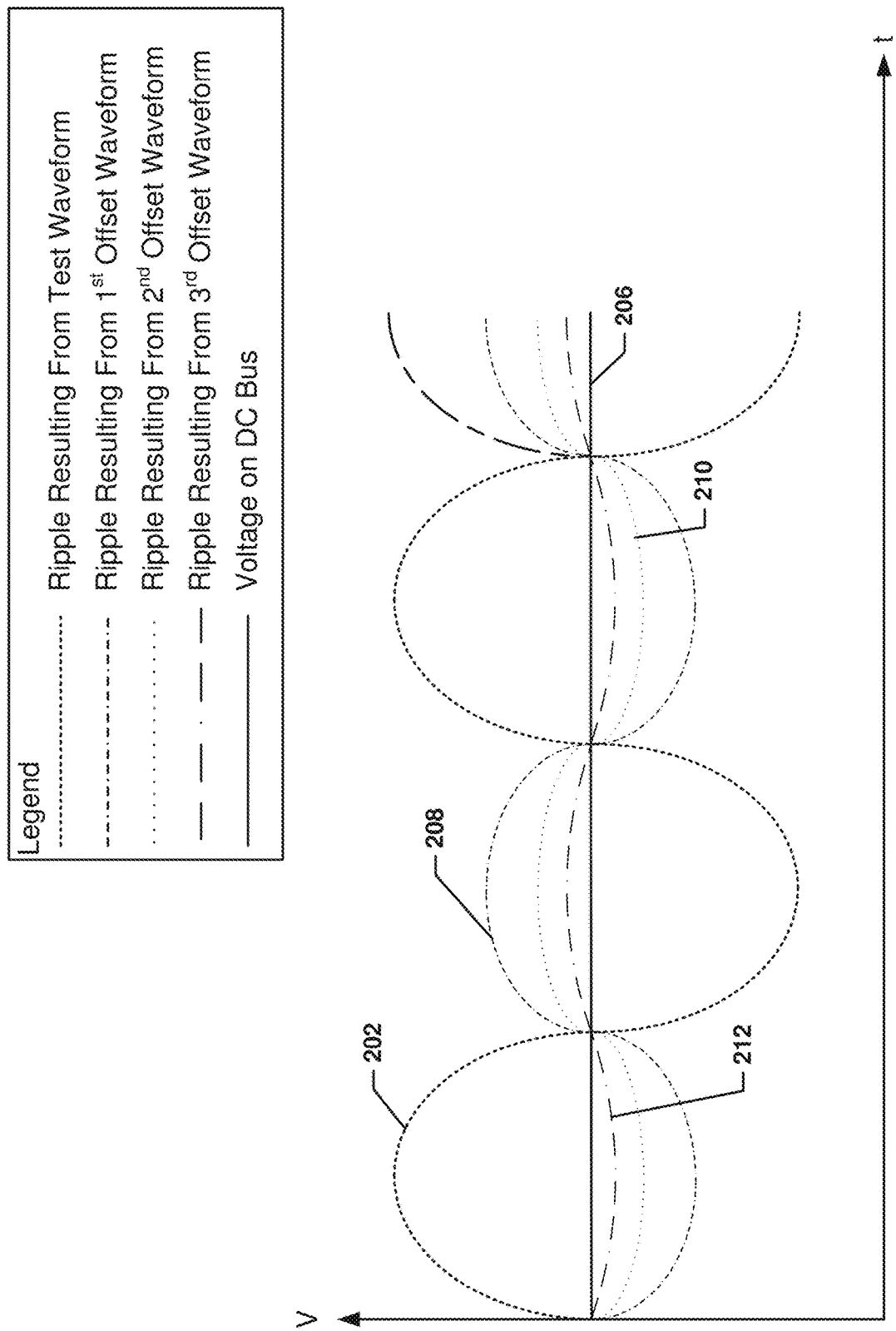

FIG. 2B is another graph illustrating canceling ripples on a DC bus over time using more than one offsetting waveform. As discussed above, a test waveform injected onto an input connection of a battery by a power electronics may result in a ripple 202 sent from the power electronics injecting the test waveform toward a DC bus. Three other power electronics may be used to generate offset waveforms injected onto input connections of three other batteries. The first offset waveform injected onto an input connection of a first other battery by the first other power electronics may result in a ripple 208 sent from that first other power electronics injecting the offset waveform toward the DC bus. The second offset waveform injected onto an input connection of a second other battery by the second other power electronics may result in a ripple 210 sent from that second other power electronics injecting the offset waveform toward the DC bus. The third offset waveform injected onto an input connection of a third other battery by the third other power electronics may result in a ripple 212 sent from that third other power electronics injecting the offset waveform toward the DC bus. The three offset waveforms may be selected such that the sum of the ripples 208, 210, and 212 may cancel ripple 202 such that the sum of the waveforms is the desired DC voltage 206 on the DC bus. While illustrated in FIGS. 2A and 2B as one generated offsetting ripple 204 or three offsetting ripples 208, 210, 212 with the same frequency as the ripple 202, more or less offsetting ripples, with different waveforms, different frequencies, phases, amplitudes, etc. may be generated and injected toward the DC bus as long as the total of any offsetting ripples plus the ripple 202 sent from the power electronics injecting the test waveform toward the DC bus results in the desired DC voltage 206 on the DC bus with no ripple.

Figure 3:
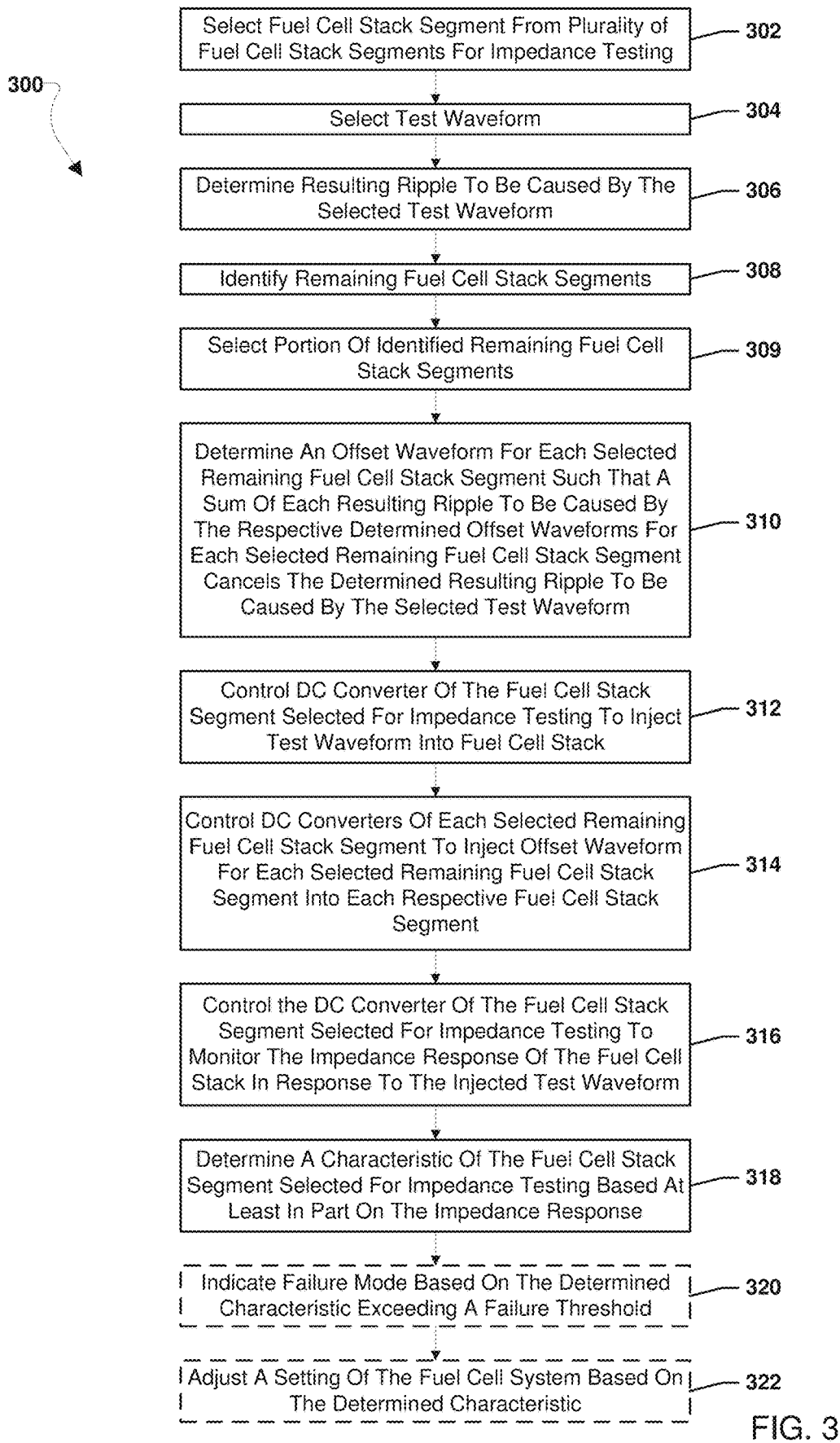
FIG. 3 is a process flow diagram illustrating an embodiment method for canceling the ripple to a DC bus caused by a test waveform.

FIG. 3 illustrates an embodiment method 300 for performing an EIS procedure on a battery stack. In an embodiment, the operations of method 300 may be performed by a controller, such as controller 138. The operations of method 300 are discussed in terms of battery stack segments and DC converters, but battery stack segments and converters are used merely as examples. Other batteries and/or other power electronics may be used in the various operations of method 300.

In block 302, the controller 138 may select a battery stack segment from a plurality of battery stack segments for impedance testing. For example, the battery stack segment may be selected based on a testing protocol governing when and in what order battery stack segments may be tested. In block 304 the controller 138 may select a test waveform. The test waveform may be selected to generate necessary oscillations for EIS monitoring, such as oscillations of approximately 1 Hz.

In block 306, the controller 138 may determine a resulting ripple to be caused by the selected test waveform. As discussed above, the resulting ripple may be the ripple output to the DC bus from the DC converter injecting the test waveform. In block 308 the controller 138 may identify the remaining battery stack segments. The remaining battery stack segments may be the battery stack segments not selected for impedance testing. In block 310 the controller 138 may select a portion of the identified remaining battery stack segments. In an embodiment, the selected portion may be all identified remaining battery stack segments. In another embodiment, the selected portion may be less than all identified remaining battery stack segments, such as only a single identified remaining battery stack segment.

In block 310, the controller 138 may determine an offset waveform for each selected remaining battery stack segment such that a sum of each resulting ripple to be caused by the respective determined offset waveforms for each selected remaining battery stack segment cancels the determined resulting ripple to be caused by the selected test waveform. In an embodiment, each offset waveform may be generated such that the resulting ripple is the same, such as one, two, three or more equal ripples that together cancel the ripple from the test waveform. In another embodiment, each offset waveform may be generated such that the resulting ripples are different, such as two, three, or more different ripples that together cancel the ripple from the test waveform.

In block 312, the controller 138 may control the DC converter of the battery stack segment selected for impedance testing to inject the test waveform into the battery stack. For example, the controller 138 may send control signals to a controller (e.g., 130, 132, 134, or 136) of the DC converter to cause the converter to perform pulse width modulation to generate the test waveform on an input connection to the battery stack segment.

In block 314, the controller 138 may control the DC converters of each selected remaining battery stack segment to inject the offset waveform for each selected remaining battery stack segment into each respective battery stack segment. For example, the controller 138 may send control signals to the controllers (e.g., 130, 132, 134, and/or 136) of the DC converters to cause the converters to perform pulse width modulation to generate the offset waveforms on an input connection to their respective battery stack segments.

The operations of the method 300 performed in blocks 312 and 314 may occur simultaneously, such that the test waveform and offset waveforms are injected at the same time resulting in ripples being output from the various DC converters that cancel each other out resulting in a desired DC voltage on the DC bus.

In block 316, the controller 138 may control the DC converter of the battery stack segment selected for impedance testing to monitor the impedance response of the battery stack in response to the injected test waveform. For example, the controller 138 may monitor the voltage and current response of the segment and determine the impedance according to method 500 described below with reference to FIG. 5.

In block 318, the controller 138 may determine a characteristic of the battery stack segment selected for impedance testing based at least in part on the impedance response. For example, the controller may use EIS monitoring to plot the real and imaginary parts of the measured impedances resulting from the injected test waveform and compare the plotted impedances to the known signatures of impedance responses of battery stack segments with known characteristics. The known signatures of impedance responses of the battery stack segments with known characteristics may be stored in a memory available to the controller (e.g., from a learned EIS database provided by an EISA network deployed in the cloud). The stored known signatures of impedance responses of the battery stack segments with known characteristics may be plots of the real and imaginary parts of the measured impedances of healthy battery stack segments and damaged/degraded battery stack segments derived from testing healthy (i.e., undamaged/undegraded) and damaged/degraded battery stack segments with various forms of damage (e.g., anode cracking) and/or degradation (e.g., segments operating in fuel starvation mode). The known characteristics may be correlated with the plots of the real and imaginary parts of the measured impedances stored in the memory. By matching the measured impedances to the known signatures of impedance responses, the current characteristics or state of the battery stack may be determined as those characteristics correlated with the matching known signature of impedance response.

In optional block 320, the controller 138 may indicate a failure mode based on the determined characteristic exceeding a failure threshold. For example, if the determined characteristic exceeds a failure threshold a failure mode of the battery stack may be indicated.

In optional block 322, the controller 138 may adjust a setting of the battery system based on the determined characteristic. For example, the controller 138 may initiate charging adjust a charging or discharging rate (e.g., increase or decrease), or shut off of the battery system based on the determined characteristic. In this manner, impedance testing, such as EIS monitoring, may be used in a battery system to adjust the operation of the battery system based on current characteristics of the battery stack segments.

Figure 4:
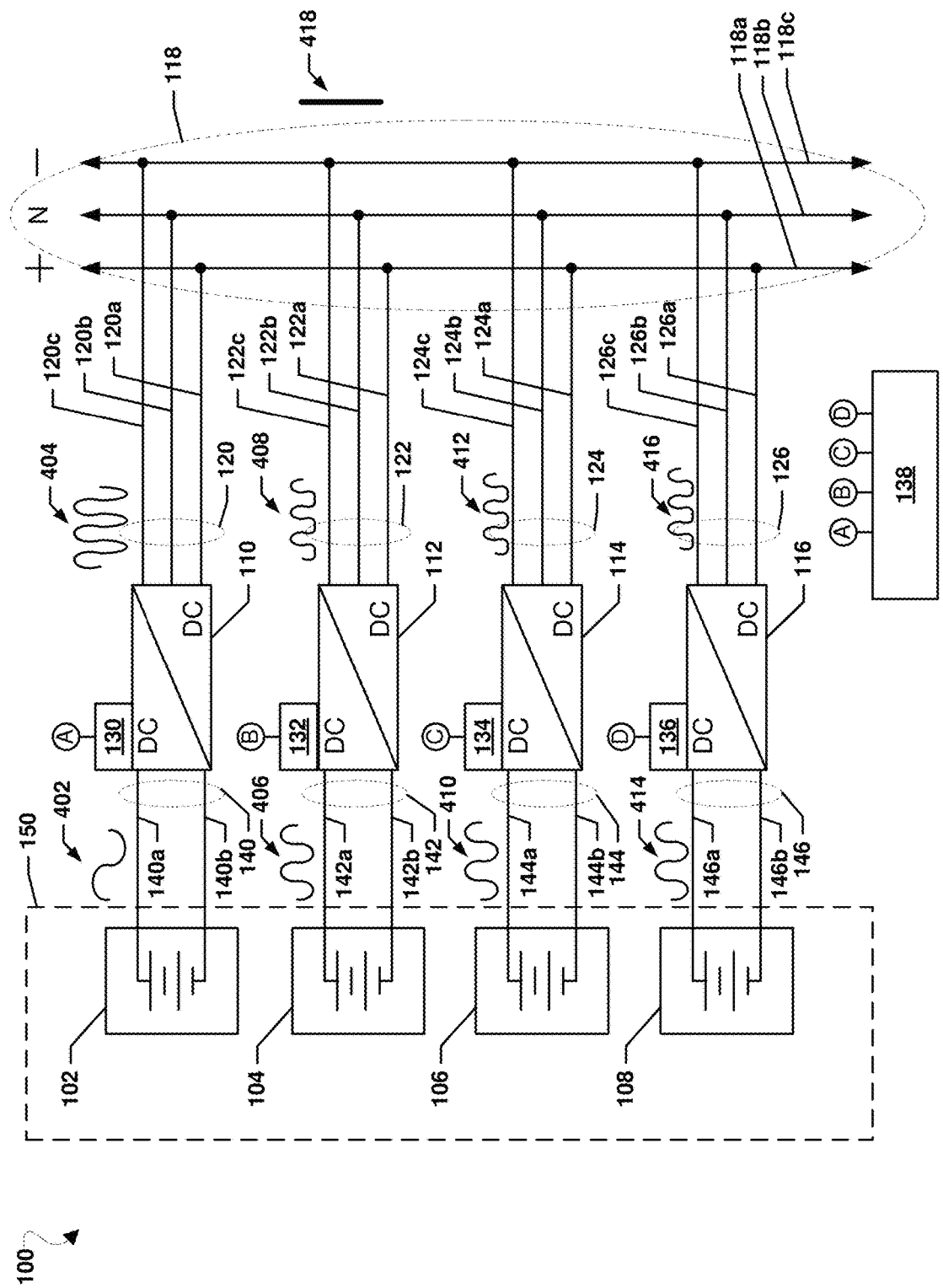
FIG. 4 is a block diagram of a system illustrating injected waveforms and resulting canceling ripples according to an embodiment.

FIG. 4 is a block diagram of the system 100 described above with reference to FIG. 1, illustrating injected waveforms 402, 406, 410, and 414 and resulting canceling ripples 404, 408, 412, and 416 according to an embodiment. A test waveform 402 may be injected into the input connection 140 resulting in a ripple 404 on the output connection 120 to the DC bus 118. An offset waveform 406 may be injected into the input connection 142 resulting in an offset ripple 408 on the output connection 122 to the DC bus 118. An offset waveform 410 may be injected into the input connection 144 resulting in an offset ripple 412 on the output connection 124 to the DC bus 118. An offset waveform 414 may be injected into the input connection 146 resulting in an offset ripple 416 on the output connection 126 to the DC bus 118. The sum of the ripples 404, 408, 412, and 416 may be such that steady DC voltage 418 without a ripple occurs on the DC bus 118 despite AC ripples occurring on the output connections 120, 122, 124, and 126. While the sum of the ripples 404, 408, 412, and 416 may be such that steady DC voltage 418 without a ripple results on the DC bus 118, the sum of the offset waveforms 406, 410, and 414 and the test waveform 402 need not equal zero. The offset ripples 408, 412, and 416 may all be the same or may be different. For example, offset ripple 408 may be a larger ripple than offset ripples 412 and 416. Additionally, whether or not the offset ripples 408, 412, and 416 are the same or different, the offset waveforms 406, 410, and 414 may not be the same. While three offset waveforms 406, 410, and 414 and their resulting offset ripples 408, 412, and 416 are illustrated, less offset waveforms and offset ripples, such as only two offset waveforms and resulting offset ripples or only one offset waveform and one resulting offset ripple, may be generated to offset the ripple 404.

In an alternative embodiment, the offset ripples 408, 412, and/or 416 may be generated by other devices, such as waveform generators, connected to output connections 122, 124, 126, and controlled by the controller 138, rather than the power electronics 112, 114, and/or 116. The offset ripples 408, 412, and/or 416 may be generated by the other devices such that the sum of the ripples 404, 408, 412, and 416 may be the steady DC voltage 418 without a ripple on the DC bus 118. Additionally, combinations of ripples generated by the power electronics 112, 114, and/or 116 and the other devices, such as additional waveform generators, may be used to cancel the ripple 404 resulting in the steady DC voltage 418 without a ripple on the DC bus 118.

Figure 5:
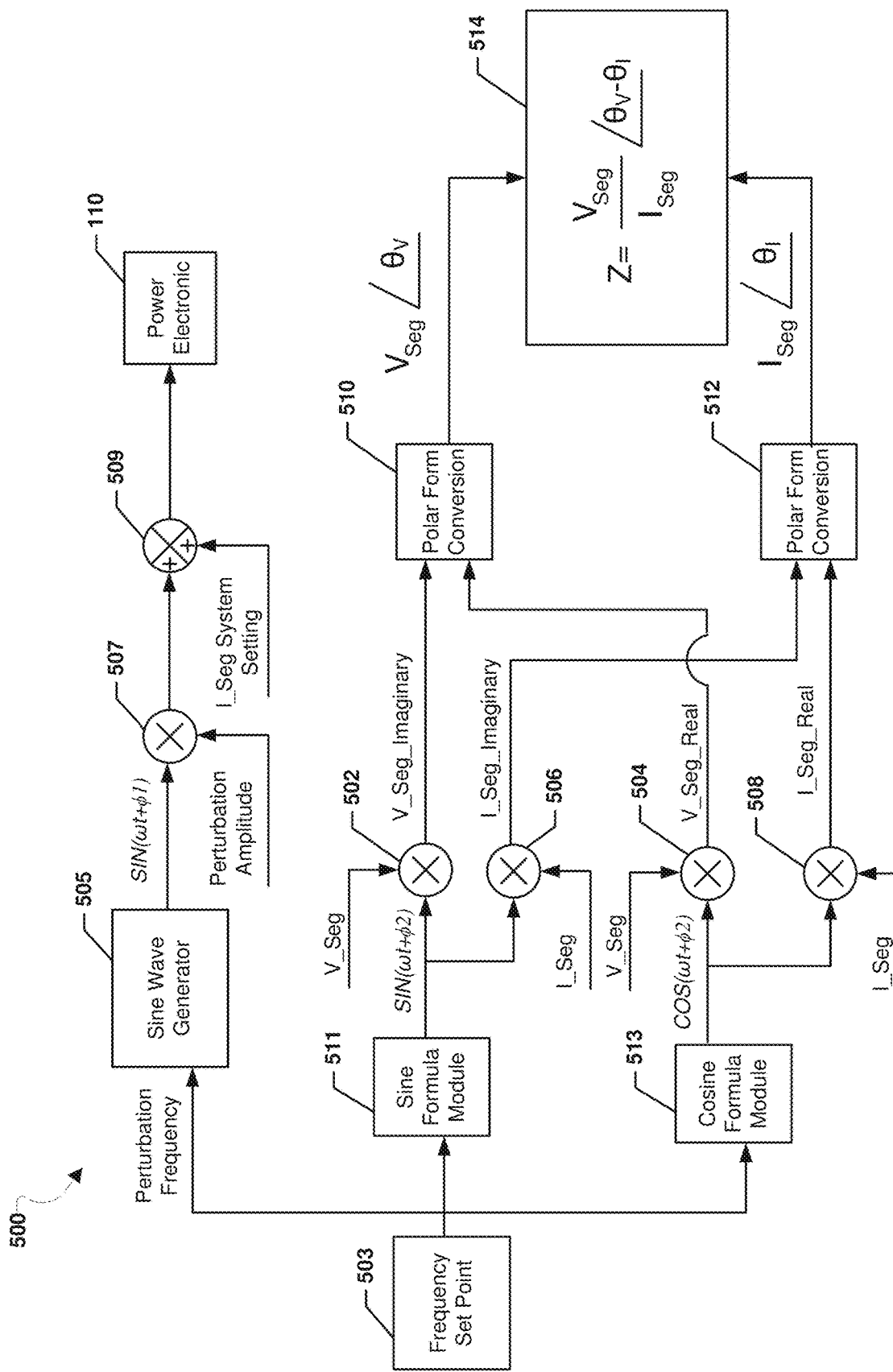
FIG. 5 is a process flow diagram illustrating an embodiment method for determining an impedance response for a battery segment.

FIG. 5 is a system block diagram illustrating a waveform generator 500 for generating wave forms for performing EIS monitoring of a battery segment. The elements of the waveform generator 500 are discussed in terms of battery stack segments and DC converters, but battery stack segments and converters are used merely as examples. Other batteries and/or other power electronics may be used in the various operations of method 500. In an embodiment, the waveform generator 500 may operate in conjunction with the operations of method 300 described above with reference to FIG. 3.

In an input 503 the controller 138 may input a frequency set point (f) for a particular EIS monitoring process. The frequency set point may be output to a sine wave generator 505 as the perturbation frequency. The sine wave generator 505 may output a waveform $SIN(\omega t+\phi 1)$ in which $\omega$ is the fundamental frequency ($2\pi f$) and $\phi 1$ is the phase angle. In multiplier circuit 507 the output waveform multiplied by the perturbation amplitude, and the result may be added to the segment set as a system setting (I_Seg System Setting) in adder circuit 509 to generate a test waveform that may be sent to the power electronic 110 for injecting the waveform into the battery segment. The current for the segment set as a system setting may be a current setting provided from the controller 138 or another controller as a target current setting for the battery segment. The power electronic 110 illustrated in FIG. 5 may be any one of the power electronics 110, 112, 114, or 116 and similar operations may be performed to control power electronics 112, 114, and 116 to inject test waveforms.

The frequency set point may also be output to a sine formula module 511 and a cosine formula module 513. The sine formula module 511 may output a waveform $SIN(\omega + \phi 2)$ in which $\omega$ is the fundamental frequency ($2\pi f$) and $\phi 2$ is the phase angle. The cosine formula module 513 may output a waveform $COS(\omega t+\phi 2)$ in which $\omega$ is the fundamental frequency ($2\pi f$) and $\phi 2$ is the phase angle.

In multiplier circuit 502 the output waveform from the sine formula module 511 may be multiplied with the voltage of the segment (V_Seg) to determine the imaginary voltage component of the segment (V_Seg_Imaginary). In multiplier circuit 506 the output waveform from the sine formula module 511 may be multiplied with the current of the segment (I_Seg) to determine the imaginary current component of the segment (I_Seg_Imaginary).

In multiplier circuit 504 may multiply the output waveform from the cosine formula module 513 with the voltage of the segment (V_Seg) to determine the real voltage component of the segment (V_Seg_Real). In multiplier circuit 508 the output waveform from the cosine formula module 513 may be multiplied with the current of the segment (I_Seg) to determine the real current component of the segment (I_Seg_Real).

Module 510 and 512 may respectively convert the real and imaginary components of the voltage of the segment and the real and imaginary components of the current of the segment to polar form voltage of the segment and polar form current of the segment.

Module 514 may determine the impedance "Z" of the segment as the polar form voltage of the segment over the polar form current of the segment. In this manner, the waveform generator 500 may enable a Fourier series calculation to be used to allow for analysis of an imperfect sinusoidal ripple at the fundamental frequency without needing to calculate a full Fast Fourier Transform. This may increase the accuracy of the impedance calculation and decrease the processing time required to determine an impedance response in comparison to impedance determinations made using a full Fast Fourier Transform.

Figure 6:
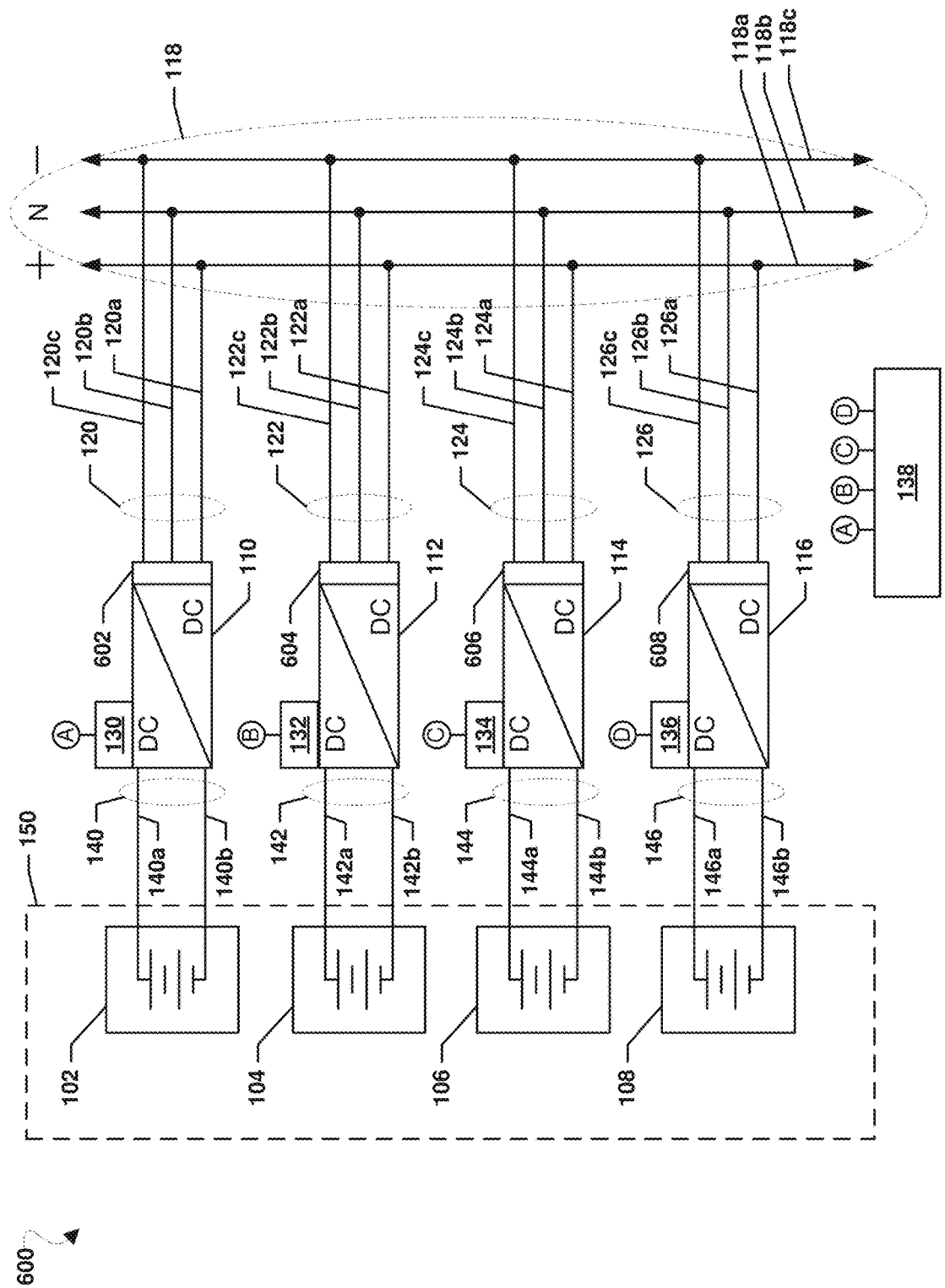
FIG. 6 is a block diagram of a system according to another embodiment.

FIG. 6 is a block diagram of a system 600 according to another embodiment. The system 600 is similar to system 100 illustrated in FIG. 1 and includes a number of components in common. Those components which are common to both systems 100 and 600 are numbered with the same numbers in FIGS. 1 and 6 and will not be described further.

The system 600 is similar to the system 100 described above with reference to FIG. 1, except that energy storage devices 602, 604, 606, and 608 may be included on the power electronics 110, 112, 114, and 116, respectively. Energy storage devices 602, 604, 606, and 608 may be any type of energy storage devices, such as capacitors, supercapacitors, batteries, etc. In an embodiment, the energy storage devices 602, 604, 606, and 608 may be on the output of their respective power electronics 110, 112, 114, and 116 to store ripple energy and discharge the ripple energy out of phase. The discharge out of phase by an energy storage device 602, 604, 606, or 608 may provide cancelation of the ripple current output on the respective output connection 120, 122, 124, or 126 to the DC bus 118 as a result of a test waveform injected into the input connection of the power electronic 110, 112, 114, or 116 associated with that energy storage device 602, 604, 606, or 608. In this manner, the energy storage device 602, 604, 606, or 608 may reduce the ripple current, or eliminate the ripple current, passing to the DC bus 118. The ability to reduce and/or eliminate the ripple current resulting from EIS testing may enable EIS testing using test waveforms with higher frequencies than may be used without the energy storage devices 602, 604, 606, or 608. For example, test waveforms with frequencies at or above 400 Hz may be used, greatly extending the bandwidth of the respective power electronics 110, 112, 114, and 116 to create and analyze test waveforms. Without the energy storage devices 602, 604, 606, or 608, the bandwidth of the test waveform frequencies may be practically limited to frequencies less than the switching frequency of the power electronics 110, 112, 114, and 116. With the energy storage devices 602, 604, 606, or 608, the bandwidth of the test waveform frequencies may extend to frequencies greater than the switching frequency of the power electronics 110, 112, 114, and 116.

While illustrated as on the output of their respective power electronics 110, 112, 114, and 116 in FIG. 6, the energy storage devices 602, 604, 606, and 608 may be on any other portions of their respective power electronics 110, 112, 114, and 116 to store ripple energy and discharge the ripple energy out of phase. In an alternative embodiment, the energy storage devices 602, 604, 606, and 608 may be on the input of their respective power electronics 110, 112, 114, and 116 to store ripple energy and discharge the ripple energy out of phase. In another alternative embodiment, an additional winding may be added to the transformers of the energy storage devices 602, 604, 606, and 608 and the energy storage devices 602, 604, 606, and 608 may be connected to the additional winding to store ripple energy and discharge the ripple energy out of phase.

EIS helps in understanding electrochemical processes by analyzing reflected electric signals that result when small, variable frequency electric signals are sent as test signals towards a battery or circuit under test. A battery's performance and health may be tested and characterized by analyzing the responses of batteries against different types of input waveforms (electric signals) using EIS.

U.S. Pat. No. 9,461,319, incorporated herein by reference in its entirety, teaches a method of performing EIS on fuel cells. A microcontroller, as shown part of an EIS system, may perform EIS tests with the help of a tester circuit. A microprocessor may apply and control the type of waveform and time of application, frequency of the signal, and other associated parameters. A battery may act as load to the input signals (small voltage signals). The output or response of the battery may be measured and stored. This data may be indicative of the state of the battery. For example, a 110 Hz sinusoidal signal may return as a phase shifted 110 Hz signal. The lead or lag angle (and amount of angle) plus the change in amplitude then may allow calculating the impedance with the V(phasor) and I(phasor) measurements. As another example, a 110 Hz sinusoidal signal may return as a chopped 105 Hz signal. The changes to the input signal may be a manifestation of changes happening inside the battery. The internal changes in the battery could be due to change in diffusion rate of ions at the electrode of the battery or due to wear and tear around the anode contact to the battery cells.

Embodiments of the present disclosure are directed to methods and systems for determining when battery conditions are suitable for charging battery-powered devices and charging the battery-powered devices without user interaction. EIS may be used to measure attributes of subcomponents of a battery, such as the internal components of the battery, interfaces between connections of components inside the battery, etc., in order to determine characteristics of each subcomponent of the battery. Since a battery may fail for many reasons, EIS testing using various test waveforms (e.g., test waveforms with different voltages, currents, and/or frequencies) may be combined with historical failure analysis to identify EIS test results that may be categorized as associated with historical failure conditions. Such EIS test results that are associated or correlated with historical failure conditions may be used to identify and/or predict interface and/or subcomponent failures in a battery. For example, the result of EIS testing of a battery may be compared to ESI test results that are associated with historical failure conditions to determine whether the result of the current EIS testing matches an ESI test results that is associated or correlated with a historical failure condition. Determining that the result of current EIS testing of the battery matches an ESI test result that is associated or correlated with a historical failure condition may indicate the historical failure condition is, or is likely, to occur in the battery. In response to determining that a historical failure condition is, or is likely, to occur in the battery, indications may be sent to graphical user interfaces of a battery-powered device to inform the user and, in some embodiments, recommend that a user take an action, such as to turnoff or power down the battery-powered device, disconnect the battery from the battery-powered device, stop charging the battery, etc. In some embodiments, the connection between the battery and the battery-powered device may be a controllable connection, such as via a remotely operated switch, and in response to determining that a historical failure condition is, or is likely, to occur in the battery, the battery may automatically be disconnected from the battery-powered device.

One advantage of identifying and/or predicting interface and/or subcomponent failures in a battery using EIS may be improved battery life since the battery-powered device may only be charged when battery conditions are suitable or preferable for charging, which may increase the overall performance and life of the battery compared to charging practices that are random or periodic regardless of battery conditions.

Embodiments of the present disclosure are directed to methods and systems for determining when battery conditions are suitable or preferable for charging without user interaction. EIS test results may be associated or correlated with battery conditions that are suitable or preferable for charging the battery. Such EIS test results that are associated or correlated with preferable battery charging conditions may be used to determine when battery charging should start and/or stop. For example, results of EIS testing of a battery may be compared to ESI test results that are associated or correlated with suitable battery charging conditions to determine whether the result of the EIS testing matches an ESI test results that is associated or correlated with a suitable charging condition. Determining that the result of current EIS testing of the battery matches an ESI test result that is associated with a suitable charging condition may indicate that battery conditions suitable for charging exist. In response to determining that battery conditions suitable for charging exist, a charger may be controlled (e.g., turned on) to charge the battery. In response to determining that battery conditions are unsuitable for charging, a charger may be controlled (e.g., turned off) to not charge the battery. Additionally, in response to determining that battery conditions are unsuitable for charging, an indication may be sent to graphical user interfaces of a battery-powered device to recommend a user take an action, such as to disconnect the battery from the battery-powered device, etc. In some embodiments, the connection between the battery and the battery-powered device may be a controllable connection, such as via a remotely operated switch, and the battery may be automatically disconnected from the battery-powered device in response to determining that battery conditions are unsuitable for charging.

One advantage of identifying suitable charging conditions in a battery using EIS may be that battery life may improve since the battery may only be charged when battery conditions are suitable or preferable for charging which may increase the overall performance and life of the battery compared to charging practices that are random or periodic regardless of battery conditions.

Figure 7:
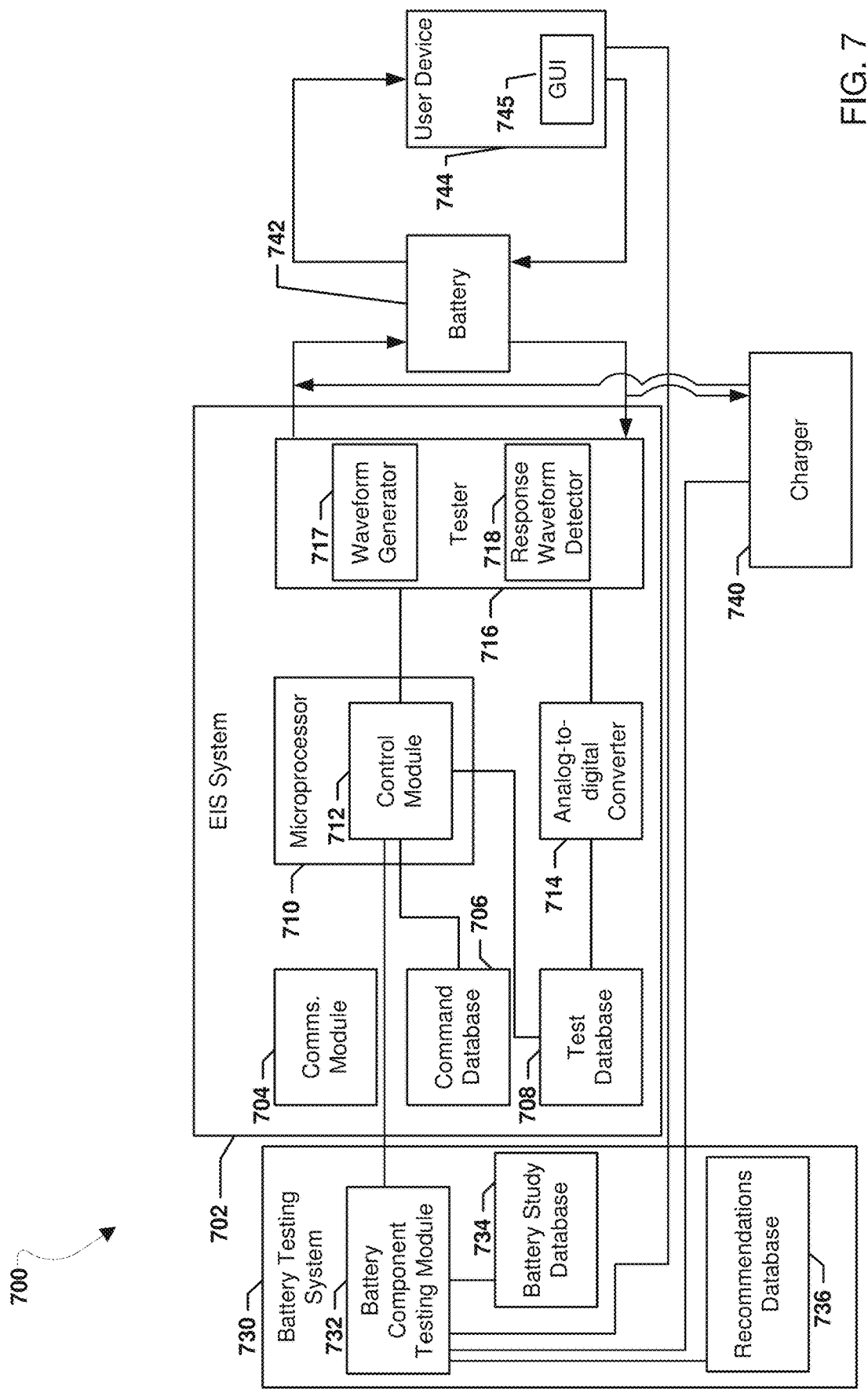
FIG. 7 is a block diagram of an EISA battery system according to an embodiment.

FIG. 7 illustrates an example of a system 700, such as an EISA battery system, according to an embodiment which includes an example EIS system 702 described in U.S. Pat. No. 9,461,319, incorporated herein by reference in its entirety. The system 700 may include a battery testing system 730 connected to an EIS system 702. The EIS system 702 may be connected to a battery 742. The battery 742 may be connected to a battery-powered device 744. The battery 742 may be any type of rechargeable battery. The battery testing system 730 may be connected to the battery-powered device 744. The battery-powered device 744 may be any type of device that is powered by the battery 742. The battery-powered device 744 may have its own internal battery that may be charged by the battery 742 when the battery-powered device 744 is connected to the battery 742. Alternatively or additionally, the battery-powered device 744 may operate directly from the charge supplied by the battery 742. In various embodiments, the battery-powered device 744 may be selectively connected and/or disconnected from the battery 742, such as by a user of the battery-powered device 744. Connecting the battery-powered device 744 to the battery 742 may enable charging of the battery of the battery-powered device 744 and disconnecting the battery-powered device 744 from the battery 742 may stop charging of the battery of the battery-powered device 744. The battery-powered device 744 may include a display configured to output a graphical user interface (GUI) 745 displaying indications to a user of the battery-powered device 744, such as recommendations from the battery testing system 730.

In various embodiments, the battery 742 may be connected to a charger 740 that may be controllable to recharge the battery 742. The charger 740 may be connected to the battery testing system 730 and the battery 742. The charger 740 may be controlled by the battery testing system 730. In some embodiments, the connection between the battery 742 and the battery-powered device 744 may be configured such that the battery 742 and battery-powered device 744 may be automatically disconnected from one another and/or reconnected to one another, such as in response to control signals from the battery testing system 730.

The system 700 may include a battery testing system 730 coupled to the battery 742. The battery testing system 730 may be a controller, microprocessor, system-on-chip (SoC), integrated circuit, or other type of circuit configured to perform operations to control the EIS system 702 to test the battery 742. The battery testing system 730 may include various devices, such as one or more memories, one or more processors configured with processor-executable instructions, etc., configured to perform operations to control the EIS system 702 to test the battery 742. As an example, the battery testing system 730 may include a battery component testing module 732 (e.g., a microcontroller, etc.) that may be connected to one or more memory locations storing a battery study database 734 and recommendations database 736.

The battery study database 734 may be a database that stores test waveforms. The test waveforms may be waveforms for use in EIS testing that may be determined, such as through research and study, to be suitable to identify battery conditions and/or characteristics (e.g., issues, performance, states, etc.) of the interfaces and/or subcomponents of the battery 742. For example, the battery study database 734 may be a database developed by research on how different waveforms may result in response waveforms that provide information regarding specific aspects or interfaces of the battery 742. Each interface may represent a separate stage in electrochemical reactions or processes being performed inside the battery 742. Each interface may be analyzed in terms of a simplified model of capacitance, inductance, and resistance or other simple electrical representations. Using information stored in the study database 734, the battery testing system 730 may determine that a first set of waveforms are suitable for testing a first type of selected interface of the battery 742, a second set of waveforms are suitable for testing a second type of selected interface of the battery 742, etc. The battery study database 734 may associate sets of one or more waveforms with respective selected interfaces, such as in test waveform tables correlating interfaces with test waveforms. The battery study database 734 may enable the battery component testing module 732 to select a test waveform suitable for testing a selected respective interface. The battery study database 734 may also associate commands with the sets of one or more waveforms associated with various interfaces. Commands may define when and for how long test signals may be applied to the battery by the EIS system 702, and when and how long the output signal (i.e., response waveform) may be measured by the EIS system 702. While illustrated as stored locally in the system 700, all or a portion of the battery study database 734 may be remotely stored, such as in a cloud computing system, remote data server, etc. when the battery testing system 730 is connected to a network, such as the Internet. For example, a time sensitive portion of the battery study database 734 may be stored locally while longer time health optimization related test waveforms of the battery study database 734 may be maintained in the cloud computing system.

The recommendations database 736 may be a database that stores results of various types that may be obtained by EIS testing of the battery 742 and decisions (or actions to take) in response to those results. For example, the recommendations database 736 may associate decisions (or actions to take) with results of EIS testing, such as response waveform recorded during EIS testing of one or more interfaces of the battery 742. As a specific example, the recommendations database 736 may correlate waveform results from EIS testing of the battery 742 with recommendations to display a particular message on a graphical user interface (GUI) 745 of the battery-powered device 744 coupled to the battery 742. Additionally, the recommendations database 736 may correlate waveform results from EIS testing of the battery 742 with indications that the interfaces of the battery 742 are in a normal condition or state (e.g., battery conditions unsuitable for charging or a state in which no change in operation of the battery 742 and/or battery-powered device 744 is recommended). The recommendations database 736 may correlate test waveforms, response waveform resulting from applying those test waveforms to the battery, and corresponding recommendations. Recommendations may be indications that that battery 742 is in normal condition or indications of the type of non-normal condition occurring at the battery 742, such as "overheating", "electrolyte breakdown started", "danger", etc. The recommendations database 736 may enable the battery component testing module 732 to determine whether or not to display recommendations on the GUI 745 of the battery-powered device 744 and/or the type of recommendations to display on the GUI 745 of the battery-powered device 744.

The battery component testing module 732 may be a module or other component of the battery testing system 730 that may run multiple EIS tests periodically (e.g., every ten minutes, less than every ten minutes, more than every ten minutes, etc.) by controlling the EIS system 702. In some embodiments, the battery component testing module 732 may be configured to connect and/or disconnect the battery 742 from the battery-powered device 744. The battery component testing module 732 may initiate EIS tests at different periodicities. For example, some higher frequency ESI tests may be performed frequently (e.g., those ESI test associated with identifying danger conditions with certain interfaces) and ESI testing encompassing a complete scan of all interfaces may be performed at longer predetermined time intervals (e.g., every 10 minutes). The battery component testing module 732 may be connected to the battery study database 734 and the recommendations database 736. Additionally, the battery component testing module 732 may be connected to the control module 712 of the microprocessor 710 of the EIS system 702. Further, the battery component testing module 732 may be connected to the charger 740.

The battery component testing module may select test waveforms from the battery study database 734 and output the selected test waveforms to the control module 712. The selected test waveforms may be used to test various interfaces in the battery 742 (e.g., an interface between the anode and the protective layer, an interface between the protective layer, an interface between the protective layer and the electrolyte, an interface between the electrolyte and the separator, an interface between the electrolyte and the cathode, etc.).

The battery component testing module 732 may receive waveform results from the control module 712 and compare the received waveform results to data in the recommendations database 736. Based on the comparison, the battery component testing module 732 may determine interface states and/or recommendations to display on the GUI 745 of the battery-powered device 744. Recommendations may include warnings, indications to disconnect the battery-powered device 744, etc. In some embodiments, when the interface state and/or recommendation is associated with being dangerous, the battery component testing module 732 may control the connections to the battery-powered device 744 to disconnect the battery 742 from the battery-powered device 744. In this manner, the battery component testing module 732 may utilize EIS test waveform results to determine when battery conditions are suitable for charging the battery-powered device 744 and charging the battery-powered device 744 without user interaction. Additionally, based on the comparison, the battery component testing module 732 may control the charger 740 to start or stop charging of the battery 742. In this manner, the battery component testing module 732 may utilize EIS test waveform results to determine when battery conditions are suitable for charging for the battery 742 and charge the battery 742 without user interaction in response to determining that battery conditions are suitable for charging.

In various embodiments, the control module 712 may control EIS testing by the various components of the EIS system 702, such as in response to test waveforms from the battery component testing module 732. The control module 712 may be an application running on a microprocessor 710. The control module 712 may receive test waveforms from the battery component testing module 732. The test waveforms may be represented in command data and waveform parameters. The command data may be sent by the control module 712 to the command database 706 and the waveform parameters may be sent to the test database 708. The command database 706 may store commands, such as "Measure for 5 seconds" and the test database 708 may store parameters, such as parameters describing the signal (e.g., frequency being 110 Hz, current 3 mA, etc.) In response to the battery component testing module 732 instructing the control module 712 to run EIS tests by sending the test waveform, the control module 712 may initiate the set of commands from the command database 706 and the parameters in the test database 708 to cause the information from the databases 706, 708 to be run through a Digital-to-Analog Converter of the microprocessor 710 to generate a test waveform for the tester 716. The battery tester circuit 716 may include a test waveform generator 717 configured to apply EIS test waveforms to the battery 742, and a response waveform detector 718 configured to measure voltage and/or current across the battery at sampling intervals to determine response waveforms. Alternatively, the response waveform detector 718 may provide analog measurements of voltage or current across the battery to the Analog-to-Digital Converter 714 to generate a digitized response waveform. The digitized result data may be stored in the test database 708. Thus, the test database 708 may store two types of information: test waveform data received from via the control module 712 sent from the battery component testing module 732 and the response waveform of the battery 742 received by the tester 716. The digitized data representing the response waveform from EIS testing of the battery 742 may be retrieved by the control module 712 from the test database 708 and sent to the battery component testing module 732. In various embodiments, the communications module 704 of the EIS system 702 may enable the EIS system to exchange information with other devices, such as via a connection to a network, the Internet, etc.

In an example operation of the system 700, EIS testing may be initiated by the battery component testing module 732 and the battery component testing module 732 may send one or more test waveforms from the selected interface of the battery 742 to be tested from the battery study database 734 to the control module 712 of the EIS system 702. The control module 712 may store the test commands for the one or more test waveforms in the command database 706 and test parameters for the one or more test waveforms in the test database 708. The test parameters may be sent to the tester 716 to perform an EIS test on the battery 742. The resulting one or more response waveforms may be stored in the test database 708 and may be sent to the battery component testing module 732. The response waveform(s) may be compared to waveforms stored in the recommendations database 736. If comparison of the response waveform(s) to stored waveforms indicates that battery conditions are not normal, the battery component testing module 732 may determine whether there is a danger level recommendation based on the matched stored waveform. In response to determining that a danger level condition exists, a suitable recommendation may be displayed on the GUI 745 of the battery-powered device 744 and/or the battery 742 may be disconnected from the battery-powered device 744. In response to the comparison of the response waveform(s) to stored waveforms indicates that battery conditions are normal, but not a danger level condition, a corresponding recommendation may be displayed on the GUI 745 of the battery-powered device 744, such as prompting a user to perform an action to assist in resolving the battery issue. In response to the comparison of the response waveform(s) to stored waveforms indicates that battery conditions are normal, or in response to displaying a recommendation on the GUI 745 of the battery-powered device 744, the battery component testing module 732 may determine whether there are any more interfaces on which to perform EIS testing, such as based on information in the battery study database 734. In response to determining there are additional interfaces to test, the battery component testing module 732 may continue EIS testing of the additional interfaces using appropriate test waveforms. In response to determining there are no additional interfaces to test, the battery component testing module 732 may wait a predetermined amount of time before repeating EIS testing of battery interfaces.

Figure 8A:
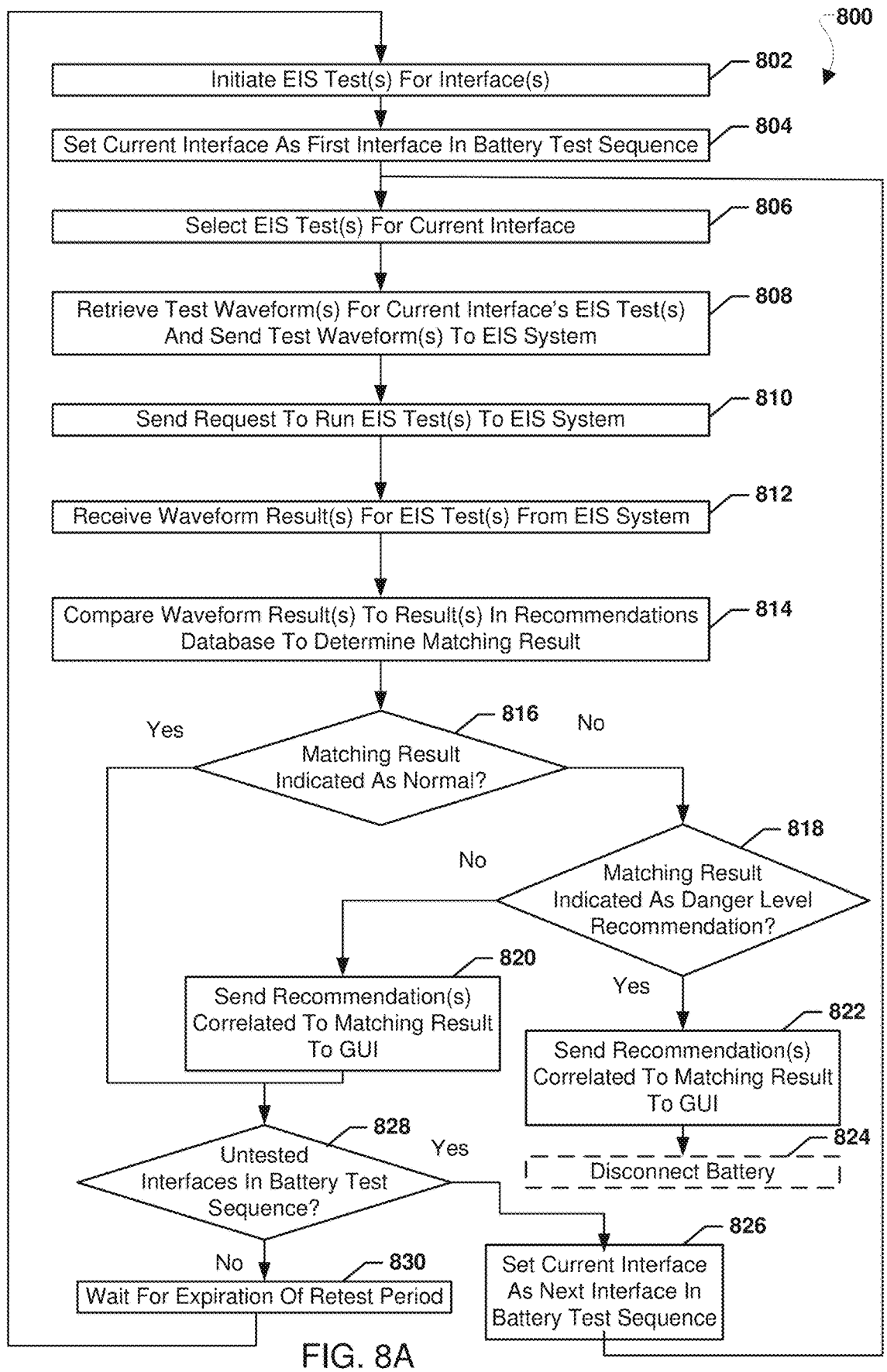
FIG. 8A is a process flow diagram illustrating an embodiment method for EIS testing of a battery.

FIG. 8A is a process flow diagram illustrating an EIS testing method 800 according to various embodiments. A battery component testing module (e.g., battery component testing module 732 of FIG. 7) may be configured to implement the method 800. This battery component testing module (e.g., battery component testing module 732 of FIG. 7) may run multiple EIS tests periodically (e.g., every 10 minutes) for various interfaces that exist between battery (e.g., battery 742 of FIG. 7) internal layers (e.g., an interface between anode and protective layer, an interface between protective layer and electrolyte, etc.). Also, some higher frequency scans may be performed much more frequently (such as those that might flag a danger signal) and a complete scan may be performed at predetermined time intervals (e.g., every 10 minutes).

The EIS testing method 800 may be initiated by sending the one or more test waveforms for the first interface from a battery study database (e.g., battery study database 734 of FIG. 7) to a control module of an EIS system (e.g., control module 712 of FIG. 7). The battery component testing module (e.g., battery component testing module 732 of FIG. 7) may proceed with EIS testing of each of the interfaces sequentially (using corresponding test waveforms) and loop back at the end of testing all of the interfaces. The tests corresponding to each interface may be identified via the battery study database. This battery study database may include test waveforms identified via research and study that may be suitable to identify issues and performance of the various interfaces. There may be an instance where the time sensitive portion of the battery study database may be held locally while the longer time health optimization portions of the battery study database may be stored remotely, such as in a cloud computing system. The battery component testing module picks these tests and run the tests via the control module of the EIS system. The response waveform observed across the battery when the test waveform is applied may be received and stored in an EIS test database (e.g., EIS test database 708 of FIG. 7). The received waveforms may be compared with waveforms stored in a recommendation database (e.g., recommendations database 736 of FIG. 7). If the response waveform matches or is similar to a stored waveform correlated with a "Normal" interface condition then the battery component testing module (e.g., battery component testing module 732 of FIG. 7) may select another test waveform for performing EIS testing on the next interface. If the response waveform matches or is similar to a stored waveform correlated with a non-normal condition then the battery component testing module may further check if the matched stored waveform is correlated or associated with a high level alert condition (e.g., a danger level alert). If the response waveform matches or is similar to a stored waveform correlated with a danger level recommendation then the battery component testing module may display a corresponding recommendation on a GUI 745 of a battery-powered device (e.g., battery-powered device 744 of FIG. 7) and determine whether the user of the battery-powered device disconnects the battery. Otherwise if the matched stored waveform is correlated or associated with a high level alert condition, the battery component testing module may display a non-danger related recommendation on the GUI of the battery-powered device. Once all interface tests are completed, the battery component testing module may wait for a period of time (e.g., a few second, ten minutes, ten minutes or more, etc.) and restart the EIS test sequence from the initial interface.

The method 800 may be implemented in software executing in a software-configurable processor (such as a central processing unit, graphics processing unit, etc.), in general purpose hardware, in dedicated hardware, or in a combination of a software-configured processor and dedicated hardware, such as a processor executing software within a system for EIS testing (e.g., system 700 FIG. 7), and various memory/cache controllers. In order to encompass the alternative configurations enabled in various embodiments, the hardware implementing the method 800 is referred to herein as a "control device." As one example implementation, the operations of method 800 may be implemented in a control device that is configured to operate as a battery component testing module (e.g., battery component testing module 732 of FIG. 7).

In block 802, the control device may initiate one or more EIS tests for one or more interfaces of a battery. The EIS tests may be a series of one or more EIS tests selected to determine the state of various interfaces of a battery, such as an interface between the anode and the protective layer, an interface between the protective layer, an interface between the protective layer and the electrolyte, an interface between the electrolyte and the separator, an interface between the electrolyte and the cathode, etc. The EIS tests may be listed in a battery test sequence which may indicate the test waveforms to used for testing each of one or more interfaces in testing order and each EIS test to be performed on each listed interface. Initiating the EIS tests may include loading the battery test sequence into a memory of the control device.

In block 804, the control device may set the current interface as the first interface in a battery test sequence. The control device may track the interfaces in sequential order according to the battery test sequence and setting the current interface as the first interface may include indicating the first interface as a tested interface, such as by setting a flag associated with testing for the first interface. In this manner, as interfaces are EIS tested, the status of tested and untested interfaces may be tracked by the control device.

In block 806, the control device may select one or more EIS tests for the current interface. The EIS tests to perform for the current interface may be indicated in the battery test sequence and/or indicated in a battery study database (e.g., battery study database 734 of FIG. 7).

In block 808, the control device may retrieve one or more test waveforms suitable for testing the current interface and send the one or more test waveforms to an EIS system. For example, based on the current interface, the control device may select one or more test waveforms from a battery study database (e.g., battery study database 734 of FIG. 7). The battery study database (e.g., battery study database 734 of FIG. 7) may include memory structures in which interface identifiers may be correlated with test waveforms. An example of such a memory structure in which interface identifiers may be correlated with test waveforms as discussed below with reference to FIGS. 9 and 10. The control device may parse the battery study database to identify matching interface identifiers for the current interface and retrieve the one or more test waveform data correlated with an interface identifier matching the current interface. The one or more test waveforms may be sent from the control device to an EIS system (e.g., control module 712 of EIS system 702 of FIG. 7). The one or more test waveforms data may include waveform descriptions and/or commands. The waveform descriptions may describe the attributes of the waveform, such as shape (e.g., amplitude, frequency, shape (e.g., sinewave, triangle wave, square wave, etc.), voltage, current, frequency, amplitude, etc. Commands may define when and for how long test waveforms may be applied to the battery, and when and how long the response waveforms may be measured.

In block 810, the control device may send a request to run the one or more EIS tests to the EIS system. For example, the request may be a command to run the EIS tests using the test waveforms sent to an EIS system (e.g., control module 712 of EIS system 702 of FIG. 7). The command may correspond to the command received with the test waveform and may define when and for how long test signals may be applied, and when and how long the output signal may be measured. In response, the EIS system may perform EIS testing on the battery using the test waveforms and may measure response waveforms resulting from the EIS testing.

In block 812, the control device may receive one or more response waveform results for the one or more EIS tests from the EIS system. For example, the EIS system (e.g., control module 712 of EIS system 702 of FIG. 7) may send digital representations of the measured response waveforms exhibited by the battery in response to EIS testing using the test waveforms.

In block 814, the control device may compare the one or more response waveforms to one or more results in a recommendations database to determine a matching result.

For example, the control device may compare the one or more response waveform received from the EIS system to a recommendations database (e.g., recommendations database 736 of FIG. 7). The recommendations database (e.g., recommendations database 736 of FIG. 7) may correlate the test waveform sent to the EIS system with a series of possible response waveform that may be sent back from the EIS system and each of the response waveform may be correlated with a respective recommendation or state indication, of that battery, such as "Normal", "Over Heating", "Danger", "Electrolyte Breakdown Started", "Suitable Charging Conditions", "Unsuitable Charging Conditions", etc. An example of a memory structure correlating test waveforms sent to the EIS system, possible response waveform results that may be sent back from the EIS system, and recommendations or state indications is described below with reference to FIG. 11. For a given test waveform sent to the EIS system, the control device may parse the correlated results for that test waveform to find a result matching the response waveform returned by the EIS system.

In determination block 816, the control device may determine whether the matching result is indicated as normal. For example, the control device may determine whether the recommendation or state indication correlated with the matching result is "Normal".

In response to the matching result being indicated as normal (i.e., determination block 816="Yes"), the control device may determine whether there are any untested interfaces in the battery test sequence in determination block 828. As an example, the control device may sequentially test interfaces according to the order of the battery test sequence. As interfaces are selected for EIS testing, the state of the interface as tested may be updated, such as by a flag setting. The control device may determine whether there are any interfaces without flag settings indicated the interface has been tested to determine whether there are any untested interfaces in the battery test sequence.

In response to determining there is an untested interface in the battery test sequence (i.e., determination block 828="Yes"), the control device may set the current interface as the next interface in the battery test sequence in block 826. In block 806, the control device may select one or more EIS tests for the current interface (e.g., the next untested interface in the battery test sequence that was set in block 826). In this manner, interfaces may be sequentially tested via EIS according to the order of the battery test sequence.

In response to determining there is no untested interface remaining in the battery sequence (i.e., determination block 828="No"), the control device may wait for an expiration of a retest period in block 830. The retest period may be an amount of time to wait before re-running a battery test sequence. The retest period may be a period of time, such as a few seconds, a few minutes, ten minutes, more than ten minutes, etc. Different battery test sequences, such as different battery test sequences for the same interface, different battery test sequence for different interfaces, battery test sequences for high importance interfaces, etc., may have different retest periods. For example, a full scan of all interfaces may be conducted every ten minutes, while EIS testing of an electrolyte interface may be done every minute such as to help identify electrolyte leakage. Upon expiration of the retest period, the control device may initiate one or more EIS tests for one or more interfaces in block 802.

In response to the matching result indicating that battery conditions are not normal (i.e., determination block 816="No"), the control device may determine whether the matching result indicates a danger level recommendation in determination block 818. For example, the control device may determine whether the recommendation or state indication correlated with the matching result is "Danger".

In response to determining that the matching result does not indicate a danger level recommendation (i.e., determination block 818="No"), the control device may display the one or more recommendations correlated to the matching result on a GUI (e.g., GUI 745 of FIG. 7) in block 820. The recommendations may be visual messages or other type indications that indicate the identified issue with the interface and/or an action for the user of the battery-powered device to take. For example, the recommendations may be messages indicating "Overheating", "Electrolyte Breakdown Started", or any other message.

In response to displaying the recommendation, the control device may determine whether there are any untested interfaces in the battery test sequence in determination block 828 as discussed above.

In response to determining that the matching result indicates a danger level recommendation (i.e., determination block 818="Yes"), the control device may display the one or more recommendations correlated to the matching result on the GUI in block 822. The recommendations may be visual messages or other type indications that indicate the identified issue with the interface and/or an action for the user of the battery-powered device to take. For example, the recommendations may be messages indicating "Danger", "Disconnect Battery", "Purchase New Battery", or any other message. In response to the recommendations from the GUI, the user of the battery-powered device may take the recommended action, such as disconnecting the battery.

In optional block 824, the control device may disconnect the battery from the battery-powered device. In some embodiments, the control device may be configured to disconnect the battery automatically from the battery-powered device. In such embodiments, in response to a danger level recommendation, the control device may disconnect the battery from the battery-powered device. The disconnection of the battery may be optional as not all control devices may be configured to automatically disconnect the battery. As a danger condition may be occurring, in response to sending the recommendations in block 822, or optionally disconnecting the battery in block 824, the method 800 may terminate to prevent further testing of a dangerous (and/or disconnected) battery.

Figure 8B:
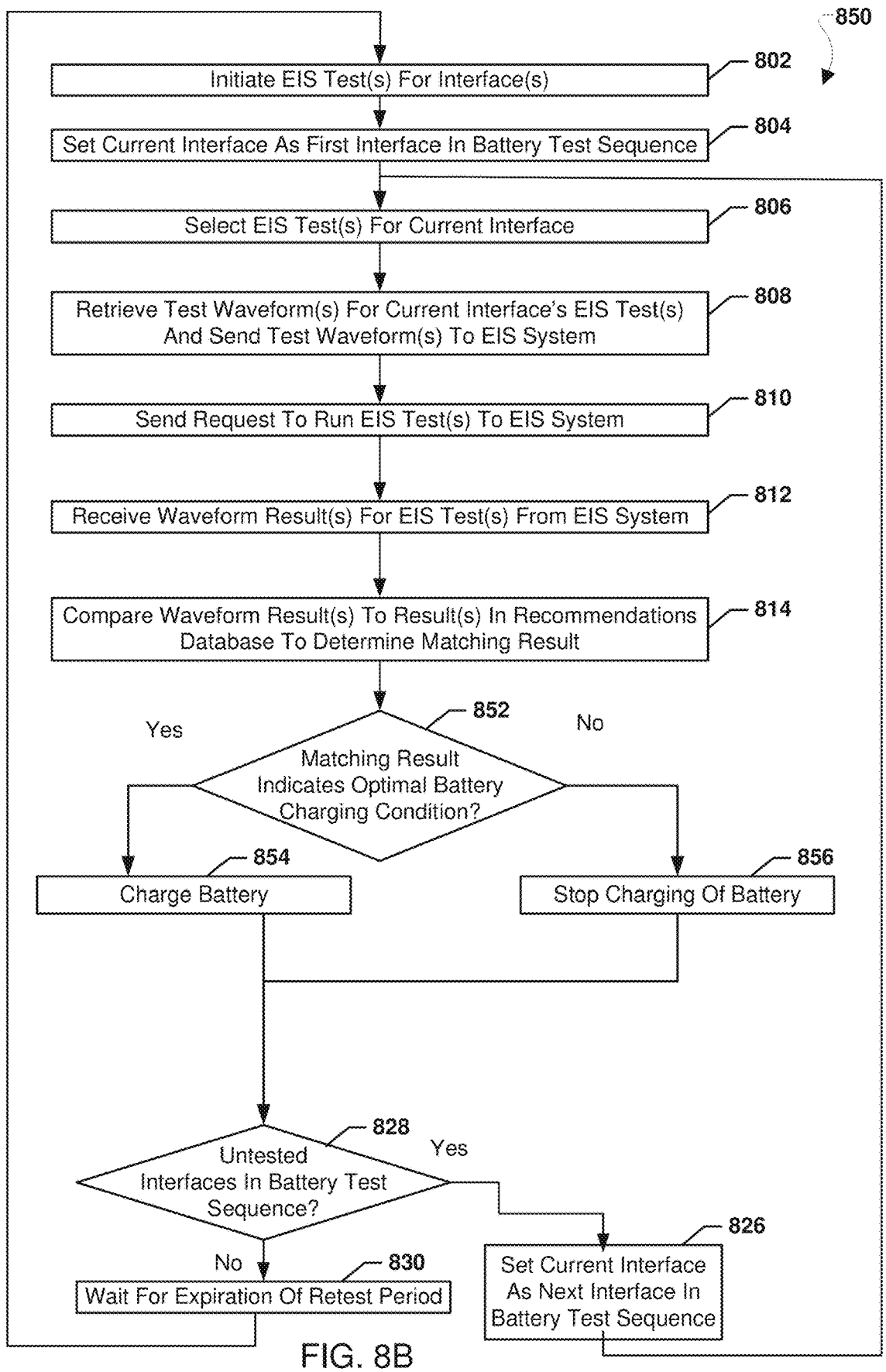
FIG. 8B is a process flow diagram illustrating an embodiment method for EIS testing of a battery

FIG. 8B is a process flow diagram illustrating an EIS testing method 850 according to various embodiments. A battery component testing module (e.g., battery component testing module 732 of FIG. 7) may be configured to implement the method 850. The method 850 may be implemented in software executing in a software-configurable processor (such as a central processing unit, graphics processing unit, etc.), in general purpose hardware, in dedicated hardware, or in a combination of a software-configured processor and dedicated hardware, such as a processor executing software within a system for EIS testing (e.g., system 700 FIG. 7), and various memory/cache controllers. In order to encompass the alternative configurations enabled in various embodiments, the hardware implementing the method 850 is referred to herein as a "control device." As one example implementation, the operations of method 850 may be implemented in a control device that is configured to operate as a battery component testing module (e.g., battery component testing module 732 of FIG. 7). In various embodiments, the operations of method 850 may be performed in conjunction with the operations of method 800.

In blocks 802-814, the control device may perform operations of like numbered blocks of the method 800 described above with reference to FIG. 8A. In determination block 852, the control device may determine whether the matching results indicates that battery conditions are suitable for charging. For example, the control device may determine whether the recommendation or state indication correlated with the matching response waveform is "Suitable Charging Conditions".

In response to the matching result indicating that battery conditions are suitable for charging (i.e., determination block 852="Yes"), the control device may charge the battery (e.g., battery 742 of FIG. 7) in block 854. As an example, the control device may send a command to a charger to cause the charger to provide current to the battery.

In response to the matching result indicating that battery conditions are unsuitable for charging (i.e., determination block 852="No"), the control device may stop charging of the battery in block 856. As an example, the control device may send a command to a charger to cause the charger to prevent directing current to the battery.

In response to starting or stopping charging in blocks 854 or 856, respectively, in blocks 828, 826, and 830 the control device may perform operations of like numbered blocks of method 800 described above with reference to FIG. 8A.

Figure 9:
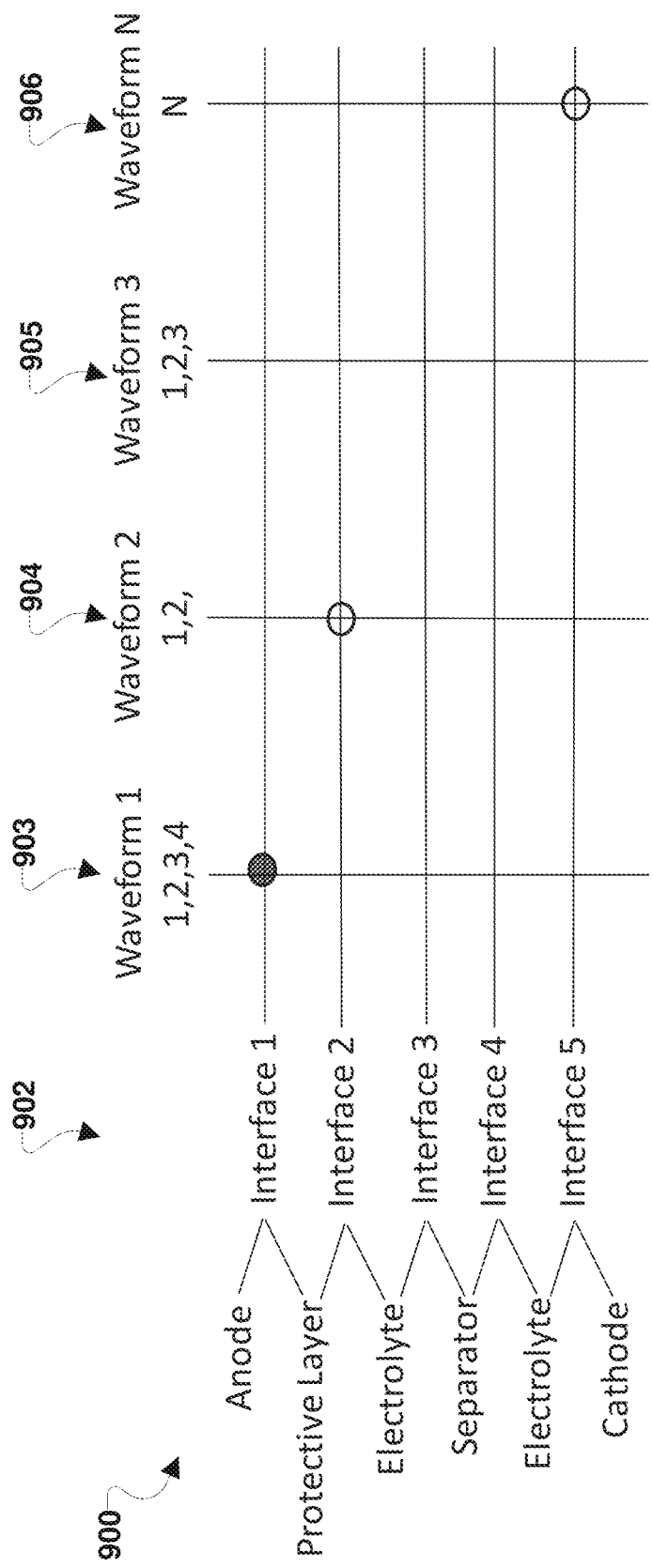
FIG. 9 illustrates a memory structure of an example battery study database according to various embodiments.

FIG. 9 is a table illustrating an example memory structure 900 of a battery study database (e.g., battery study database 734 of FIG. 7) according to various embodiments. The battery study database may be developed by research on how different waveforms can be focused on specific interfaces. Each interface may represent a separate stage in electrochemical reactions or processes being performed inside the battery and can be analyzed in terms of simplified models of capacitance, inductance and/or resistance or other simple electrical representations.

The memory structure 900 may include a listing of interfaces 902 and indications of different waveforms 903, 904, 905, and 906. Different ones of the waveforms 903, 904, 905, and 906 may be indicated as associated with EIS testing for the listed interfaces 902. For example, as shown in memory structure 900, waveform 1 (i.e., waveform 903) may include a set of waveforms 1, 2, 3, and 4 and may be indicated as suitable for testing Interface 1 (i.e., the Anode and Protective Layer interface). Waveform 2 (i.e., waveform 904) may include a set of waveforms 1, 2 and may be indicated as suitable for testing Interface 2 (i.e., the Protective Layer and Electrolyte interface). The memory structure 900 may include any number of waveforms (N) and similarly each waveform through waveform N may be indicated as suitable for testing one or more interfaces in the listing of interfaces 902. The memory structure 900 stored in the battery study database (e.g., battery study database 734 of FIG. 7) may enable the battery component testing module (e.g., battery component testing module 732 of FIG. 7) to select corresponding tests for respective interfaces.

FIG. 10 is a table illustrating an example memory structure 1000 of a battery study database (e.g., battery study database 734 of FIG. 7) according to various embodiments. Column 1002 stores the interface of the battery (e.g., battery 742 of FIG. 7) for which the test waveform and command may be sent to the EIS system (e.g., EIS system 702 of FIG. 7). Column 1004 stores the identifier for the test waveform. For example, there may be multiple test waveforms that are found suitable for the first interface as indicated by interface 1 appearing twice in column 1002. The multiple different test waveforms suitable for the same interfaces may be represented by a common naming convention, such as by identifier Waveform 1.1, Waveform 1.2 and Waveform 1.N and so on. Column 1006 stores the commands corresponding to the test waveform. Commands may define when and for how long test waveforms may be applied, and when and how long the response waveform may be measured. For example, commands may include "Apply input for 2 seconds and measure output for 3 seconds", "Apply input for 12 seconds and measure output for 20 seconds," etc. Alternatively or additionally, there may be other forms of instructions in various embodiments that can be stored in column 1006, such as a complex test pattern in the form of Data file (.DAT format). Column 1007 may represent the test waveform that needs to be applied and signifies the parameters that may used in forming the test waveform. For example, the parameters of the test waveform may be "Sinusoid 100 Hz, 3 mA, 4.1V", "Sinusoid, 200 Hz, 2m", "Sinusoid, 100 Hz, 2 mA", etc. The parameters of the test wave form may define any parameter, such as the frequency, amplitude, etc. of the test waveform.

FIG. 11 is a table illustrating an example memory structure 1100 of a battery recommendations database (e.g., recommendations database 736 of FIG. 7) according to various embodiments. A battery recommendations database (e.g., recommendations database 736 of FIG. 7) may be a matrix of decisions against various type of results obtained from EIS tests for specific interfaces. For example, as illustrated in columns 1102, 1104, 1106, and 1108 of structure 1100, waveform 1.1 may be specific to Interface 1 (e.g., the Anode and Protective Layer interface) and there may be N possible results each indicative of a particular condition of this interface. For example, Result 1 corresponding to column 1104 may be represented by W1.1R1.DAT showing that if test results are similar to W1.1R1.DAT then the recommendation is not needed as condition is interpreted as "Normal" as indicated in column 1104 for waveform 1.1. However, as indicated in column 1108, result N for waveform 1.1 represented by W1.1RN.DAT indicates that a dangerous condition exists (i.e., the recommendation is "Danger") at interface 1 tested by waveform 1.1. The danger recommendation may be an indication that immediate actions, such as disconnecting the battery, buying a new battery, etc., should be taken. Similarly, column 1106 illustrates conditions that are not normal, but are also not dangerous conditions. Thus, the recommendations, such as "over heating" may be displayed on a GUI (e.g., GUI 745 of FIG. 7) when the response waveform matches the waveform data (e.g., W1.1R2.DAT for waveform 1.1) in column 1106.

Figure 12:
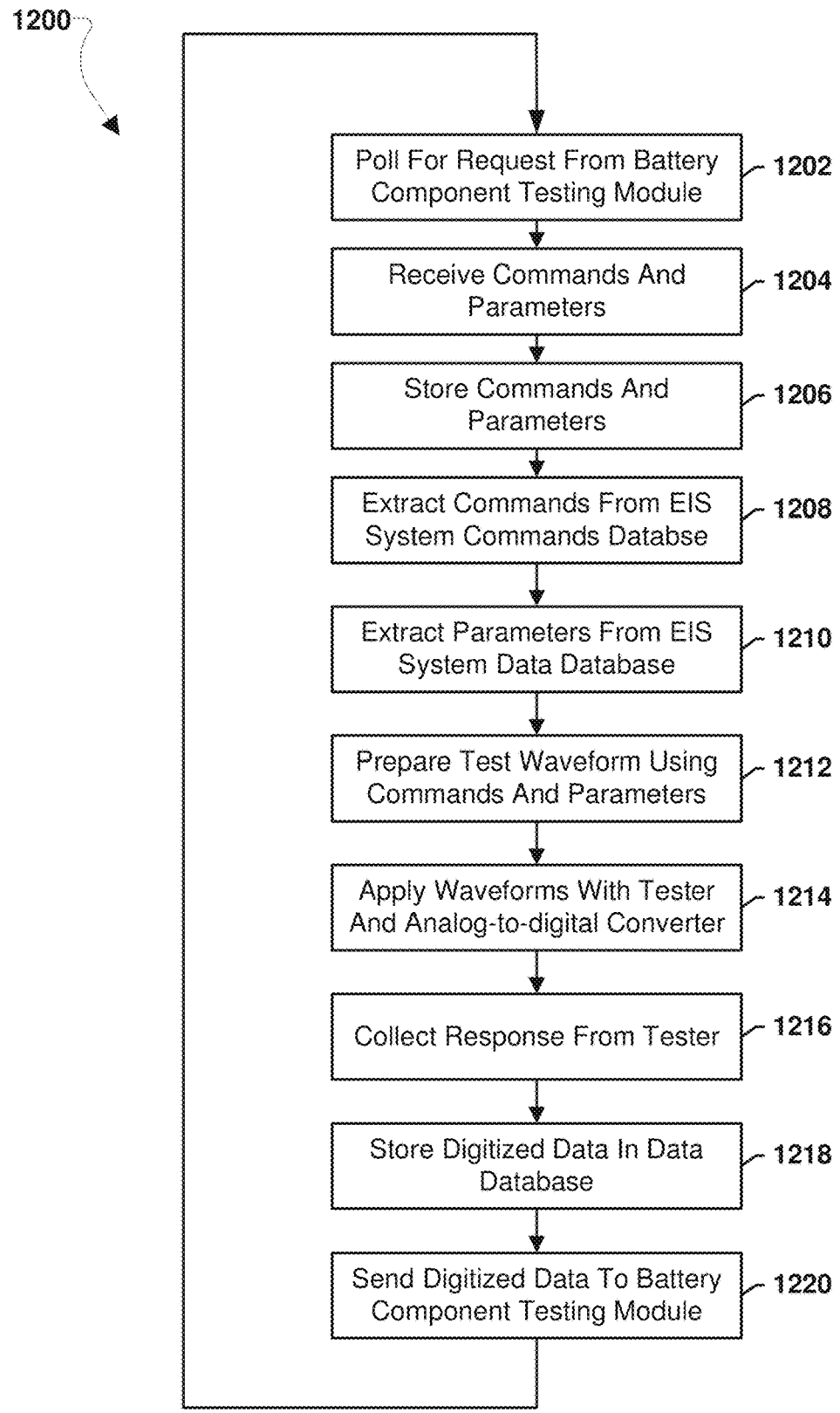
FIG. 12 is a process flow diagram illustrating an embodiment method for EIS system control to enable EIS testing.

FIG. 12 illustrates a method 1200 for EIS system control according to various embodiments. The operations of method 1200 may be implemented by a control module of an EIS system, such as control module 712 of EIS system 702 of FIG. 7. In various embodiments, the control module (e.g., control module 712 of FIG. 7) may poll for the requests from a battery testing system battery component testing module (e.g., battery component testing module 732 of FIG. 7). These requests can be with regards to testing the battery (e.g., battery 742 of FIG. 7) against a particular test waveform. The test waveform may be represented in terms of command data and waveform parameters. The control module (e.g., control module 712 of FIG. 7) may receive the commands and parameters from the battery component testing module (e.g., battery component testing module 732 of FIG. 7). These commands and parameters may be provided by the battery component testing module (e.g., battery component testing module 732 of FIG. 7) from a battery study database (e.g., battery study database 734 of FIG. 7) and stored by the control module (e.g., control module 712 of FIG. 7) in the a command database of the EIS system (e.g., command database 706 of FIG. 7) and in a test database of the EIS system (e.g., test database 708 of FIG. 7), respectively. The command database of the EIS system (e.g., command database 706 of FIG. 7) may store the commands, such as "Measure for 5 seconds", while the test database of the EIS system (e.g., test database 708 of FIG. 7) may store the parameters describing the signal, such as frequency being 110 Hz and current 3 mA, etc. The battery component testing module (e.g., battery component testing module 732 of FIG. 7) may instruct the control module (e.g., control module 712 of FIG. 7) to run the EIS tests. The control module (e.g., control module 712 of FIG. 7) may then initiate the set of commands with respect to the data in the test database (e.g., test database 708 of FIG. 7), and by running the information through a digital-to-analog converter of the microprocessor (e.g., microprocessor 710 of FIG. 7) running the control module (e.g., control module 712 of FIG. 7) may generate a waveform for a tester (e.g., tester 716 of FIG. 7). The tester may create a final test waveform that is applied to the battery (e.g., battery 742 of FIG. 7). The tester may receive the response waveform and may put the response waveform through an analog-to-digital converter (e.g., analog-to-digital converter 714 of FIG. 7). The digitized response waveform may be stored in the test database of the EIS system (e.g., test database 708 of FIG. 7). The digitized response waveform may be then sent to the battery component testing module (e.g., battery component testing module 732 of FIG. 7) and the control module (e.g., control module 712 of FIG. 7) may return to polling requests.

The method 1200 may be implemented in software executing in a software-configurable processor (such as a central processing unit, graphics processing unit, etc.), in general purpose hardware, in dedicated hardware, or in a combination of a software-configured processor and dedicated hardware, such as a processor executing software within a system for EIS testing (e.g., system 700 FIG. 7), and various memory/cache controllers. In order to encompass the alternative configurations enabled in various embodiments, the hardware implementing the method 1200 is referred to herein as a "control device." As one example implementation, the operations of method 120 may be implemented in a control device that is configured to operate as a control module (e.g., control module 712 of FIG. 7) of an EIS system (e.g., EIS system 702 of FIG. 7). In various embodiments, the operations of method 1200 may be performed in conjunction with the operations of methods 800 and/or 850.

In block 1202, the control device may poll for a request from a battery component testing module (e.g., e.g., battery component testing module 732 of FIG. 7). The request from the component testing module (e.g., e.g., battery component testing module 732 of FIG. 7) may be an EIS test request that may instruct the control device to test the coupled battery (e.g., battery 472 of FIG. 7). In some embodiments, the EIS test request may include any combination of battery identifying information for the battery. The control device may check a communication interface, such as communication port or communication module (e.g., comms. module 704 in FIG. 7), for a request from the charger control module.

In block 1204, the control device may receive commands and parameters associated with a test waveform. The test waveform may be represented in terms of command data and waveform parameters. The command data and waveform parameters may be received from the component testing module (e.g., e.g., battery component testing module 732 of FIG. 7) and the component testing module (e.g., e.g., battery component testing module 732 of FIG. 7) may have selected those commands and parameters from a battery study database (e.g., battery study database 734 of FIG. 7) for testing a selected interface of a battery (e.g., battery 472 of FIG. 7).

In block 1206, the control device may store the commands and parameters. The control device may store the commands for the test waveform in a command database of the EIS system (e.g., command database 706 of FIG. 7) and the parameters of the test waveform in a test database of the EIS system (e.g., test database 708 of FIG. 7).

In block 1208, the control device may extract EIS testing commands from the EIS system command database. The control device may retrieve entries of EIS testing commands associated with the battery identifying information from the EIS system command database (e.g., command database 706 of FIG. 7). Available EIS testing commands may be returned from the EIS system command database (e.g., command database 706 of FIG. 7).

In block 1210, the control device may extract parameters from the EIS system test database (e.g., test database 708 of FIG. 7). The control device may retrieve entries of parameters, such as parameters that define an EIS test waveform associated with the battery identifying information from the EIS system test database (e.g., test database 708 of FIG. 7). Available parameters may be returned from the EIS system test database (e.g., test database 708 of FIG. 7).

In block 1212, the control device may prepare an EIS test waveform using EIS testing commands and parameters. The control device may use the parameters to generate the EIS test waveform and use the EIS testing commands to determine how long to generate the EIS test waveform. The control device may load the parameters and the EIS testing commands and use the parameters and the EIS testing commands to signal a digital-to-analog converter with digital signals of instructions for generating the EIS test waveform.

In block 1214, the control device may apply the EIS test waveform to the battery (e.g., battery 472 of FIG. 7). The control device may send the digital signals of instructions for generating the EIS test waveform to a digital-to-analog converter so that the digital-to-analog converter may convert the digital signals to analog signals. The analog signals may be provided to a tester (e.g., tester 716 of FIG. 7), which may respond to the analog signals by generating an EIS test waveform according to the instructions of the analog signals. The tester (e.g., tester 716 of FIG. 7) may apply the generated EIS test waveform to the battery (e.g., battery 472 of FIG. 7) coupled to the EIS system. The tester (e.g., tester 716 of FIG. 7) may apply the generated EIS test waveform to the battery (e.g., battery 472 of FIG. 7) for a period as indicated by the analog signals and may cease generating the EIS test waveform upon expiration of the period.

In block 1216, the control device may measure a response waveform. The tester (e.g., tester 716 of FIG. 7) may receive a response waveform from the battery (e.g., battery 472 of FIG. 7) exhibited in response to the EIS test waveform. The tester (e.g., tester 716 of FIG. 7) may provide the response waveform to the analog-to-digital converter (e.g., analog-to-digital converter 714 of FIG. 7), which may convert the analog response waveform to a digital response waveform. The control device may receive the digital response waveform.

In block 1218, the control device may store the digital response waveform to the EIS system test database (e.g., test database 708 of FIG. 7). In some embodiments, the control device may format the digital response waveform as a digital data file, such as a ".dat" format file. The control device may store the digital response waveform to the EIS system test database (e.g., test database 708 of FIG. 7) in a manner such that the digital response waveform may be associated with battery identifying information in the EIS system test database (e.g., test database 708 of FIG. 7) for the tested battery.

In block 1220, the control device may send the digitized data to the battery component testing module (e.g., battery component testing module 732 of FIG. 7). For example, the digitized data may be sent from the EIS system test database (e.g., test database 708 of FIG. 7) by the control device. The method 1200 may proceed to block 1202 to poll for the next EIS test request.

FIGS. 13A and 13B are tables illustrating an EIS system 702 test database 708 and an EIS system 702 command database 706, respectively. These databases 708, 706 include portions of information also stored in the battery study database 734 that may be received from the battery component testing module 732 via the control module 712. When a test is requested by the battery component testing module 732, the tests are received from the battery study database 734 via the battery component testing module 732 and the parameters and commands related to the tests are sent to the control module 712 to store the data into the test database 708 and the command database 706, respectively.

FIG. 13A illustrates the test database 708, which includes waveform data related to EIS tests that may be performed on the connected battery (or batteries) to test the battery state. Column one 1302 and column two 1304 stores the battery type and the battery identifier. Column three 1306 stores the parameters of the test waveform that may be generated. The parameters may be a type of signal, such as sinusoidal, square, etc., an amplitude, a frequency, a power density, etc. Column four 1308 stores the output or response waveform in digital data file format that may be generated by passing the output waveform obtained from the tester 716 through analog-to-digital converter 714.

FIG. 13B illustrates the command database 706, may represent instructions (e.g., the commands) that may be sent to the tester 716 for conducting an EIS test. Column one 1312 and column two 1314 may store a battery type and a battery identifier. Column three 1316 may store commands, such as when and for how long test signals may be applied to the battery, and when and how long output signals from the battery may be measured. There may be other forms of instructions possible that may be stored in the command database 706.

With reference to FIGS. 1-13B, various embodiments include an EISA system, comprising: an electrochemical impedance spectroscopy ("EIS") system connected to a battery (742), and a battery testing system connected to the EIS system, the battery testing system comprising: a battery component testing module (732), a battery study database (734) storing one or more test waveforms each associated with a respective interface of the battery, and a recommendations database (736) storing one or more waveforms correlated with one or more battery conditions and corresponding recommendations. In various embodiments, the battery component testing module is configured to send a request to run an EIS test on the battery using at least one test waveform selected from the battery study database to the EIS system, receive a response waveform result from running the EIS test on the battery using the at least one test waveform, compare the response waveform to waveforms stored in the recommendations database to identify a matching waveform, determine whether the matching waveform indicates a normal battery condition, and display a recommendation correlated to the matching waveform from the recommendations database on a graphical user interface ("GUI") (745) of a battery-powered device (745) connected to the battery in response to determining that the matching waveform does not indicate a normal battery condition.

In some embodiments the battery component testing module is further configured to select the EIS test based on an interface of the battery to be tested, retrieve the at least one test waveform from the battery study database based on the EIS test, and send the at least one test waveform to the EIS system.

In some embodiments the battery component testing module is configured such that display the recommendation correlated to the matching result from the recommendations database on the GUI of the battery-powered device connected to the battery in response to determining that the matching waveform does not correspond to a normal battery condition comprises determining whether the matching waveform is correlated with a danger level recommendation in the recommendations database, and displaying a recommendation corresponding to the matching waveform from the recommendations database on the GUI of the battery-powered device connected to the battery in response to determining the matching waveform is correlated with a danger level recommendation in the recommendations database. In such embodiments, the battery component testing module may be further configured to disconnect the battery from the battery-powered device in response to determining that the matching waveform is correlated with a danger level recommendation in the recommendations database. In such embodiments, the battery component testing module may be further configured to display a different recommendation correlated to the matching result from the recommendations database on the GUI of the battery-powered device connected to the battery in response to determining the matching waveform is not correlated with a danger level recommendation in the recommendations database. In such embodiments, the different recommendation indicates one or both of an identified issue with an interface of the battery tested by the test waveform and an action for a user of the battery-powered device to take.

Some embodiments may further include a charger (740) connected to the battery, in which the battery component testing module is further configured to determine whether the matching waveform indicates battery conditions suitable for charging, control the charger to charge the battery in response to determining that the matching waveform indicates battery conditions are suitable for charging, and control the charger to stop charging the battery in response to determining the matching waveform indicates battery conditions are unsuitable for charging.

With reference to FIGS. 1-13B, various embodiments include a method for electrochemical impedance spectroscopy ("EIS") testing of a battery, comprising applying an EIS test waveform to an EIS system to the battery, receiving a response waveform result from the battery, comparing the response waveform to waveforms in a recommendations database to determine a matching waveform, determining whether the matching result indicates a normal battery condition, and displaying a recommendation correlated to the matching waveform from the recommendations database on a graphical user interface ("GUI") of a battery-powered device connected to the battery in response to determining that the matching waveform does not indicate a normal battery condition. Some embodiments may further include selecting the EIS test based on an interface of the battery to be tested, retrieving the at least one test waveform from the battery study database based on the EIS test, and applying the at least one test waveform to the battery.

In some embodiments, displaying a recommendation correlated to the matching waveform from the recommendations database on a graphical user interface ("GUI") of a battery-powered device connected to the battery comprises determining whether the matching waveform is correlated with a danger level recommendation in the recommendations database, and displaying a recommendation corresponding to the matching waveform from the recommendations database on the GUI of the battery-powered device connected to the battery in response to determining the matching waveform is correlated with a danger level recommendation in the recommendations database. Some embodiments may further include disconnecting the battery from the battery-powered device in response to determining that the matching waveform is correlated with a danger level recommendation in the recommendations database. Some embodiments may further include displaying a different recommendation correlated to the matching result from the recommendations database on the GUI of the battery-powered device connected to the battery in response to determining the matching waveform is not correlated with a danger level recommendation in the recommendations database. In such embodiments, the different recommendation indicates one or both of an identified issue with an interface of the battery tested by the test waveform and an action for a user of the battery-powered device to take.

Some embodiments may further include determining whether the matching waveform indicates battery conditions suitable for charging, controlling a charger to charge the battery in response to determining that the matching waveform indicates battery conditions are suitable for charging, and controlling the charger to stop charging the battery in response to determining the matching waveform indicates battery conditions are unsuitable for charging.

The foregoing method descriptions and diagrams are provided merely as illustrative examples and are not intended to require or imply that the steps of the various embodiments must be performed in the order presented. As will be appreciated by one of skill in the art the order of steps in the foregoing embodiments may be performed in any order. Further, words such as "thereafter," "then," "next," etc. are not intended to limit the order of the steps; these words are simply used to guide the reader through the description of the methods.

One or more diagrams have been used to describe exemplary embodiments. The use of diagrams is not meant to be limiting with respect to the order of operations performed. The foregoing description of exemplary embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

Control elements may be implemented using computing devices (such as computer) comprising processors, memory and other components that have been programmed with instructions to perform specific functions or may be implemented in processors designed to perform the specified functions. A processor may be any programmable microprocessor, microcomputer or multiple processor chip or chips that can be configured by software instructions (applications) to perform a variety of functions, including the functions of the various embodiments described herein. In some computing devices, multiple processors may be provided. Typically, software applications may be stored in the internal memory before they are accessed and loaded into the processor. In some computing devices, the processor may include internal memory sufficient to store the application software instructions.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some blocks or methods may be performed by circuitry that is specific to a given function.

The preceding description of the disclosed embodiments is provided to enable any person skilled in the art to make or use the described embodiment. Various modifications to these embodiments will be readily apparent to those skilled in the art, and the generic principles defined herein may be applied to other embodiments without departing from the scope of the disclosure. Thus, the present invention is not intended to be limited to the embodiments shown herein but is to be accorded the widest scope consistent with the following claims and the principles and novel features disclosed herein.

What is claimed is:

1. An electrochemical impedance spectroscopy analyzer ("EISA") system, comprising:
   an electrochemical impedance spectroscopy ("EIS") system connected to a battery; and
   a battery testing system connected to the EIS system, the battery testing system comprising:
      a battery component testing module;
      a battery study database storing one or more test waveforms each associated with a respective interface of the battery; and
      a recommendations database storing one or more waveforms correlated with one or more battery conditions and corresponding recommendations, wherein the battery component testing module is configured to:
send a request to run an EIS test on the battery using at least one test waveform selected from the battery study database to the EIS system;
receive a response waveform result from running the EIS test on the battery using the at least one test waveform;
compare the response waveform to waveforms stored in the recommendations database to identify a matching waveform;
determine whether the matching waveform indicates a normal battery condition; and
display a recommendation correlated to the matching waveform from the recommendations database on a graphical user interface ("GUI") of a battery-powered device connected to the battery in response to determining that the matching waveform does not indicate a normal battery condition.

2. The EISA system of claim 1, wherein the battery component testing module is further configured to:
select the EIS test based on an interface of the battery to be tested;
retrieve the at least one test waveform from the battery study database based on the EIS test; and
send the at least one test waveform to the EIS system.

3. The EISA system of claim 1, wherein the battery component testing module is configured such that display the recommendation correlated to the matching result from the recommendations database on the GUI of the battery-powered device connected to the battery in response to determining that the matching waveform does not correspond to a normal battery condition comprises:
determining whether the matching waveform is correlated with a danger level recommendation in the recommendations database; and
displaying a recommendation corresponding to the matching waveform from the recommendations database on the GUI of the battery-powered device connected to the battery in response to determining the matching waveform is correlated with a danger level recommendation in the recommendations database.

4. The EISA system of claim 3, wherein the battery component testing module is further configured to disconnect the battery from the battery-powered device in response to determining that the matching waveform is correlated with a danger level recommendation in the recommendations database.

5. The EISA system of claim 3, wherein the battery component testing module is further configured to display a different recommendation correlated to the matching result from the recommendations database on the GUI of the battery-powered device connected to the battery in response to determining the matching waveform is not correlated with a danger level recommendation in the recommendations database.

6. The EISA system of claim 5, wherein the different recommendation indicates one or both of an identified issue with an interface of the battery tested by the test waveform and an action for a user of the battery-powered device to take.

7. The EISA system of claim 1, further comprising a charger connected to the battery,
wherein the battery component testing module is further configured to
determine whether the matching waveform indicates battery conditions suitable for charging;
control the charger to charge the battery in response to determining that the matching waveform indicates battery conditions are suitable for charging; and
control the charger to stop charging the battery in response to determining the matching waveform indicates battery conditions are unsuitable for charging.

8. A method for electrochemical impedance spectroscopy ("EIS") testing of the battery using the EISA system of claim 1, the method comprising:
applying the at least one test waveform which comprises an EIS test waveform from the EISA system to the battery;
receiving the response waveform result from the battery;
comparing the response waveform to the waveforms in the recommendations database to determine the matching waveform;
determining whether the matching result indicates the normal battery condition; and
displaying the recommendation correlated to the matching waveform from the recommendations database on the graphical user interface ("GUI") of the battery-powered device connected to the battery in response to determining that the matching waveform does not indicate the normal battery condition.

9. A method for electrochemical impedance spectroscopy ("EIS") testing of a battery, comprising:
applying an EIS test waveform from an EIS system to the battery;
receiving a response waveform result from the battery;
comparing the response waveform to waveforms in a recommendations database to determine a matching waveform;
determining whether the matching result indicates a normal battery condition; and
displaying a recommendation correlated to the matching waveform from the recommendations database on a graphical user interface ("GUI") of a battery-powered device connected to the battery in response to determining that the matching waveform does not indicate a normal battery condition.

10. The method of claim 9, further comprising:
selecting the EIS test based on an interface of the battery to be tested;
retrieving the at least one test waveform from the battery study database based on the EIS test; and
applying the at least one test waveform to the battery.

11. The method of claim 9, wherein displaying a recommendation correlated to the matching waveform from the recommendations database on a graphical user interface ("GUI") of a battery-powered device connected to the battery comprises:
determining whether the matching waveform is correlated with a danger level recommendation in the recommendations database; and
displaying a recommendation corresponding to the matching waveform from the recommendations database on the GUI of the battery-powered device connected to the battery in response to determining the matching waveform is correlated with a danger level recommendation in the recommendations database.

12. The method of claim 11, further comprising disconnecting the battery from the battery-powered device in response to determining that the matching waveform is correlated with a danger level recommendation in the recommendations database.

13. The method of claim 11, further comprising displaying a different recommendation correlated to the matching result from the recommendations database on the GUI of the battery-powered device connected to the battery in response to determining the matching waveform is not correlated with a danger level recommendation in the recommendations database.

14. The method of claim 13, wherein the different recommendation indicates one or both of an identified issue with an interface of the battery tested by the test waveform and an action for a user of the battery-powered device to take.

15. The method of claim 9, further comprising:
determining whether the matching waveform indicates battery conditions suitable for charging;
controlling a charger to charge the battery in response to determining that the matching waveform indicates battery conditions are suitable for charging; and
controlling the charger to stop charging the battery in response to determining the matching waveform indicates battery conditions are unsuitable for charging.

\* \* \* \* \*